United States Patent
Pershing et al.

(10) Patent No.: US 10,528,960 B2
(45) Date of Patent: *Jan. 7, 2020

(54) AERIAL ROOF ESTIMATION SYSTEM AND METHOD

(75) Inventors: Chris Pershing, Redmond, WA (US); Dave P. Carlson, Anaheim, CA (US)

(73) Assignee: Eagle View Technologies, Inc., Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/371,271

(22) Filed: Feb. 10, 2012

(65) Prior Publication Data
US 2012/0209782 A1  Aug. 16, 2012

Related U.S. Application Data

(63) Continuation of application No. 12/148,439, filed on Apr. 17, 2008, now Pat. No. 8,145,578.
(Continued)

(51) Int. Cl.
*G06Q 10/00* (2012.01)
*G06Q 30/02* (2012.01)
(Continued)

(52) U.S. Cl.
CPC ......... *G06Q 30/0206* (2013.01); *G06Q 10/00* (2013.01); *G06Q 30/0283* (2013.01); *G06Q 40/08* (2013.01); *G06Q 50/16* (2013.01)

(58) Field of Classification Search
CPC ....... G06T 7/337; G06T 7/32; G06Q 30/0206; G06Q 10/00; G06Q 30/0283; G06Q 40/08; G06Q 50/16
(Continued)

(56) References Cited

U.S. PATENT DOCUMENTS 2,791,151 A  5/1957  Pennington
3,617,016 A  11/1971  Bolsey
(Continued)

FOREIGN PATENT DOCUMENTS

AU  742146 B2 * 12/2001 ............. G06T 5/006
AU  2008230031 B8  11/2009
(Continued)

OTHER PUBLICATIONS

"Roof with a View" Mann, Will Contract Journal v431n6552; Nov. 23, 2005; pp. 29 from Dialog.*
(Continued)

*Primary Examiner* — Rupangini Singh
(74) *Attorney, Agent, or Firm* — Dunlap Codding, P.C.

(57) ABSTRACT

A system that allows the remote measurement of the size, geometry, pitch and orientation of the roof sections of a building and then uses the information to provide an estimate to repair or replace the roof, or to install equipment thereon. The system includes an aerial image file database that shows aerial images of buildings in a designated area according to address. The slope and orientation images are typically oblique perspective views and top plan views of the buildings in the area. The system also includes an image analysis and calibration feature that enables the viewer to closely estimate the size, geometry and orientation of the building's roof sections. The information can then be used to prepare a cost estimate for the repair or replacement of the roof or installation of roof equipment. By simply inputting the potential customer's address, the company is able to determine the size, geometry, pitch and orientation of the roof sections of the building at that address, and then quickly provide an accurate estimate to the customer.

8 Claims, 9 Drawing Sheets

Related U.S. Application Data

(60) Provisional application No. 60/925,072, filed on Apr. 17, 2007.

(51) Int. Cl.
*G06Q 40/08* (2012.01)
*G06Q 50/16* (2012.01)

(58) Field of Classification Search
USPC .................................................. 705/400, 7.35
See application file for complete search history.

(56) References Cited

U.S. PATENT DOCUMENTS

| | | |
|---|---|---|
| 5,247,356 A | 9/1993 | Ciampa |
| 5,379,105 A | 1/1995 | Iki et al. |
| 5,596,494 A | 1/1997 | Kuo |
| 5,633,946 A | 5/1997 | Lachinski et al. |
| 5,633,995 A | 5/1997 | McClain |
| 5,936,628 A | 8/1999 | Kitamura et al. |
| 5,983,010 A | 11/1999 | Murdock et al. |
| 6,323,885 B1 | 11/2001 | Wiese |
| 6,333,749 B1 | 12/2001 | Reinhardt et al. |
| 6,385,541 B1 | 5/2002 | Blumberg et al. |
| 6,396,491 B2 | 5/2002 | Watanabe et al. |
| 6,446,053 B1 | 9/2002 | Elliott |
| 6,448,964 B1 | 9/2002 | Isaacs et al. |
| 6,496,184 B1 | 12/2002 | Freeman et al. |
| 6,636,803 B1 | 10/2003 | Hartz, Jr. et al. |
| 6,741,757 B1 | 5/2004 | Torr et al. |
| 6,836,270 B2 | 12/2004 | Du |
| 6,980,690 B1 | 12/2005 | Taylor et al. |
| 7,003,400 B2 | 2/2006 | Bryant |
| 7,006,977 B1 | 2/2006 | Attra et al. |
| 7,133,551 B2 | 11/2006 | Chen et al. |
| 7,233,691 B2 | 6/2007 | Setterholm |
| 7,305,983 B1 * | 12/2007 | Meder ..................... G01W 1/12 126/621 |
| 7,324,666 B2 | 1/2008 | Zoken et al. |
| 7,327,880 B2 | 2/2008 | Tek |
| 7,333,963 B2 | 2/2008 | Widrow et al. |
| 7,343,268 B2 | 3/2008 | Kishikawa |
| 7,373,303 B2 | 5/2008 | Moore et al. |
| 7,424,133 B2 | 9/2008 | Schultz et al. |
| 7,428,337 B2 | 9/2008 | Gao et al. |
| 7,460,214 B2 | 12/2008 | Schiavi |
| 7,487,114 B2 | 2/2009 | Florance et al. |
| 7,500,391 B2 | 3/2009 | Woro |
| 7,509,241 B2 | 3/2009 | Guo et al. |
| 7,519,206 B2 | 4/2009 | Mulet-Parada et al. |
| 7,583,275 B2 | 9/2009 | Neumann et al. |
| 7,629,985 B2 | 12/2009 | McArdle et al. |
| 7,639,842 B2 | 12/2009 | Kelle et al. |
| 7,728,833 B2 | 6/2010 | Verma et al. |
| 7,752,018 B2 | 7/2010 | Rahmes et al. |
| 7,787,659 B2 | 8/2010 | Schultz et al. |
| 7,844,499 B2 | 11/2010 | Yahiro et al. |
| 7,869,944 B2 | 1/2011 | Deaton et al. |
| 7,873,238 B2 | 1/2011 | Schultz et al. |
| 7,920,963 B2 | 4/2011 | Jouline et al. |
| 7,991,226 B2 | 8/2011 | Schultz et al. |
| 7,995,799 B2 | 8/2011 | Schultz et al. |
| 7,995,862 B2 | 8/2011 | Tao et al. |
| 8,051,089 B2 | 11/2011 | Gargi et al. |
| 8,068,643 B2 | 11/2011 | Schultz et al. |
| 8,078,436 B2 | 12/2011 | Pershing et al. |
| 8,081,798 B2 | 12/2011 | Paglieroni et al. |
| 8,081,841 B2 | 12/2011 | Schultz et al. |
| 8,131,514 B2 | 3/2012 | Royan et al. |
| 8,145,578 B2 | 3/2012 | Pershing et al. |
| 8,170,840 B2 | 5/2012 | Pershing |
| 8,204,341 B2 | 6/2012 | Schultz et al. |
| 8,209,152 B2 | 6/2012 | Pershing |
| 8,233,666 B2 | 7/2012 | Schultz et al. |
| 8,385,672 B2 | 2/2013 | Giuffrida et al. |
| 8,401,222 B2 | 3/2013 | Thornberry et al. |
| 8,417,061 B2 | 4/2013 | Kennedy et al. |
| 8,538,151 B2 | 9/2013 | Shimamura et al. |
| 8,538,918 B1 | 9/2013 | Pearcy et al. |
| 8,624,920 B2 | 1/2014 | Fujinaga |
| 9,129,376 B2 | 9/2015 | Pershing |
| 9,135,737 B2 | 9/2015 | Pershing |
| 9,279,602 B2 | 3/2016 | Kennedy et al. |
| 2002/0010594 A1 | 1/2002 | Levine |
| 2002/0101594 A1 | 8/2002 | Slatter |
| 2002/0143669 A1 | 10/2002 | Scheer |
| 2002/0154174 A1 | 10/2002 | Redlich et al. |
| 2003/0028393 A1 | 2/2003 | Coulston et al. |
| 2003/0103651 A1 | 6/2003 | Novak |
| 2003/0171957 A1 | 9/2003 | Watrous |
| 2003/0233310 A1 | 12/2003 | Stavrovski |
| 2004/0128313 A1 | 7/2004 | Whyman |
| 2005/0129306 A1 | 6/2005 | Wang et al. |
| 2005/0267657 A1 | 12/2005 | Devdhar |
| 2005/0288959 A1 | 12/2005 | Eraker et al. |
| 2006/0137736 A1 | 6/2006 | Nishitani et al. |
| 2006/0169775 A1 | 8/2006 | Gray et al. |
| 2006/0200311 A1 | 9/2006 | Arutunian et al. |
| 2006/0232605 A1 | 10/2006 | Imamura |
| 2006/0235611 A1 * | 10/2006 | Deaton et al. ................. 701/207 |
| 2006/0262112 A1 | 11/2006 | Shimada |
| 2006/0265287 A1 | 11/2006 | Kubo |
| 2007/0058850 A1 | 3/2007 | Luo et al. |
| 2007/0081714 A1 * | 4/2007 | Wallack ................. G06K 9/209 382/152 |
| 2007/0107242 A1 * | 5/2007 | Montogmery ........... G01C 9/24 33/451 |
| 2007/0179757 A1 * | 8/2007 | Simpson ............................. 703/1 |
| 2007/0220174 A1 | 9/2007 | Abhyanker |
| 2008/0089610 A1 | 4/2008 | Tao et al. |
| 2008/0162380 A1 | 7/2008 | Suga et al. |
| 2008/0204570 A1 | 8/2008 | Schultz et al. |
| 2008/0221843 A1 | 9/2008 | Shenkar et al. |
| 2008/0231700 A1 | 9/2008 | Schultz et al. |
| 2008/0262789 A1 | 10/2008 | Pershing et al. |
| 2009/0046759 A1 | 2/2009 | Lee et al. |
| 2009/0085915 A1 | 4/2009 | Kelley et al. |
| 2009/0141020 A1 | 6/2009 | Freund et al. |
| 2009/0216552 A1 | 8/2009 | Watrous |
| 2009/0225026 A1 | 9/2009 | Sheba |
| 2009/0304227 A1 | 12/2009 | Kennedy et al. |
| 2010/0034483 A1 | 2/2010 | Giuffrida et al. |
| 2010/0179787 A2 | 7/2010 | Pershing et al. |
| 2010/0241406 A1 | 9/2010 | Rahmes et al. |
| 2011/0086201 A1 | 4/2011 | Shiao et al. |
| 2011/0096083 A1 | 4/2011 | Schultz |
| 2011/0187713 A1 | 8/2011 | Pershing et al. |
| 2011/0205245 A1 | 8/2011 | Kennedy et al. |
| 2011/0216962 A1 | 9/2011 | Kim et al. |
| 2012/0007982 A1 | 1/2012 | Giuffrida et al. |
| 2012/0035887 A1 | 2/2012 | Augenbraun et al. |
| 2012/0066187 A1 | 3/2012 | Pearcy et al. |
| 2012/0170797 A1 | 7/2012 | Pershing et al. |
| 2012/0191424 A1 | 7/2012 | Pershing |
| 2012/0209782 A1 | 8/2012 | Pershing et al. |
| 2012/0223965 A1 | 9/2012 | Pershing |
| 2012/0224770 A1 | 9/2012 | Strassenburg-Kleciak |
| 2013/0202157 A1 | 8/2013 | Pershing |
| 2013/0204575 A1 | 8/2013 | Pershing |
| 2013/0216089 A1 | 8/2013 | Chen et al. |
| 2013/0226515 A1 | 8/2013 | Pershing et al. |
| 2013/0262029 A1 | 10/2013 | Pershing |
| 2013/0311240 A1 | 11/2013 | Pershing et al. |
| 2013/0346020 A1 | 12/2013 | Pershing |
| 2014/0046627 A1 | 2/2014 | Pershing |
| 2014/0177945 A1 | 6/2014 | Pershing et al. |
| 2014/0279593 A1 | 9/2014 | Pershing |
| 2015/0015605 A1 | 1/2015 | Pershing |
| 2015/0016689 A1 | 1/2015 | Pershing |

(56) References Cited

U.S. PATENT DOCUMENTS

| | | |
|---|---|---|
| 2015/0370928 A1 | 12/2015 | Pershing |
| 2015/0370929 A1 | 12/2015 | Pershing |

FOREIGN PATENT DOCUMENTS

| | | | | |
|---|---|---|---|---|
| CA | 2191954 A1 | 12/1995 | | |
| CA | 2 641 373 A1 | 10/2009 | | |
| CN | 102194120 A | 9/2011 | | |
| DE | 198 57 667 A1 | 8/2000 | | |
| DE | EP 1010966 B1 * | 10/2002 | ............ | G01C 11/06 |
| EP | 1 010 966 B1 | 10/2002 | | |
| EP | 1 619 610 A1 | 1/2006 | | |
| EP | 2 251 833 | 11/2010 | | |
| WO | 00/29806 A2 | 5/2000 | | |
| WO | 2005/124276 A2 | 12/2005 | | |
| WO | 2006/040775 A2 | 4/2006 | | |
| WO | 2006/090132 A2 | 8/2006 | | |
| WO | 2009/046459 A1 | 4/2009 | | |
| WO | 2011/094760 A2 | 8/2011 | | |

OTHER PUBLICATIONS

AppliCad, World Class Technology Leading the Way in Roofing Software, Product Bulletin—Nov. 2002, 1-42 http://web.archive.org/web/20050618190621/http://www.applicad.com.au/ProductBulletinNov02.pdf.*

Norohna et al., Detection and Modeling of Buildings from Multiple Images, May 2001, IEEE Transactions on Pattern Analysis and Machine Intelligence, vol. 23, No. 5, pp. 501-518.*

U.S. Appl. No. 60/425,275, filed Nov. 8, 2002, 32 pp.

"AeroDach® Online Dachauswertung: Standardlieferformat und 3D-Datensatz," AEROWEST GmbH,Version 01.00.2002, 6 pages.

"AeroDach® Online Roof Analysis: Standard Delivery Format and 3D Dataset," AEROWESTGmbH, Version as of 00-01-2002, 6 pages.

"AppliCad Software and EagleView® Technologies Partner for Metal Roofing Contractors," EagleView Technolgies and AppliCad Software, retrieved from blog.eagleview.com/?=614 on Feb. 1, 2012, 2 pages.

"Definitions of Surveying and Associated Terms," American Congress on Surveying and Mapping, reprinted 1989, p. 3, 2 pages.

"Glossary of the Mapping Sciences," American Society of Civil Engineering, ASCE Publications, 1994, pp. 9-10, 3 pages.

"Microsoft's MSN Virtual Earth: The Map is the Search Platform," Directions Magazine URL=http://www.directionsmag.com/article.php?article_id=873&trv=1, retrieved Feb. 6, 2009, 10 pages.

"Pictometry—In the News," URL=http://204.8.121.114/pressrelease%20archived/pressrelease_aec.asp, retrieved Feb. 6, 2009, 3 pages.

"Software; New Products," LexisNexis Roofing Contractor article 23(2):121(2), Jan. 3, 2006, 1 page.

"Sorcerer: Nobody builds roofs like this builds roofs," retrieved from URL=http://web.archive.org/web/2006021409237/http://www.applicad.com.au/product-features . . . on Mar. 29, 2012, 2 pages.

Aerodach, "Protokoll zur Dachauswertung," Oct. 19, 2010, 12 pages.

Aerowest GmbH, "AeroDach—das patentierte Dachaufmass," Jan. 1, 2006, retrieved from URL=http://web.archive.org/web/20060101021543/http://www.aerowest.de/aerodach.html on Mar. 25, 2012, 2 pages.

Aerowest GmbH, "Aerowest Pricelist of Geodata," Oct. 21, 2005, 2 pages.

Aerowest GmbH, "GEODATA Service; AeroDach—Patented Roof Dimensions," Jan. 1, 2006, retrieved from URL=http://web.archive.org/web/20060101021543/http://www.aerowest.de/aerodach.html, 1 page.

Aerowest GmbH. "Preisliste Geodaten Aerowest," Oct. 21, 2005, 1 page.

Appli-cad Australia, "Linear Nesting Reports," AppliCad Sample Reports, Jul. 18, 2000, 9 pages.

Appli-cad Australia, "Roof Magician: Especially suited to single, shake and tile roofing," Sample Reports, Jun. 24, 2004, 13 pages.

Appli-cad Australia, "Roof Wizard: Advanced Software for Roof Modeling and Estimating," Document Issue 1.0.0, Sep. 25, 2004, 10 pages.

Appli-cad Australia, "Roof Wizard: Especially suited to metal roofing," Generate Offcuts Reports, Mar. 9, 2005, 7 pages.

Appli-cad Australia, "Roof Wizard: Especially suited to metal roofing," Generate Offcuts Reports, Sep. 14, 2006, 7 pages.

Appli-cad Australia, "Roof Wizard: Especially suited to metal roofing," Sample Reports, Jul. 13, 2004, 24 pages.

Appli-cad Australia, "Roof Wizard: Especially suited to metal roofing," Sample Reports, Sep. 17, 2002, 12 pages.

Appli-cad Australia, "Sorcerer: Advanced Software for Roof Modeling and Estimating," Reference Guide Version 3, Sep. 8, 1999, 142 pages.

Appli-cad Australia, "Sorcerer: The complete solution for professional roof estimating," Demonstration Kit, Mar. 9, 2005, 15 pages.

AppliCad Roofing, sample report dated Jul. 30, 2007, 1 page.

Applicad Roofing, sample report dated Mar. 2, 2005, 28 pages.

AppliCad USA, "Linear Nesting Reports," AppliCad Sample Reports, Nov. 25, 1999, 9 pages.

Applicad webpage 2005 snip different color lines, 1 page.

AppliCad, "Example Output and Brochures," retrieved from URL=http://www.applicad.com/au/product-reports.html on Apr. 16, 2012, 2 pages.

AppliCad, "Product Overview—Sorcerer: Advanced Software for Roofing Modeling, Estimating, Presentation and Installation," Issue 5, Mar. 2, 2001, 15 pages.

AppliCad, "Roofing Software: Product Bulletin Section 1—Modeling the Roof," Dec. 20, 2005, retrieved from URL=htpp://web.archive.org/web/20021122204408/http://www.applicad.com.au/ on Apr. 16, 2012, 3 pages.

AppliCad, "Roofing Software: Product Bulletin Section 1—Modeling the Roof," Jan. 7, 2002, retrieved from URL=htpp://web.archive.org/web/20021122204408/http://www.applicad.com.au/ on Apr. 16, 2012, 3 pages.

AppliCad, "Roofing Software: Product Bulletin Section 2—Modifying the Model," Dec. 20, 2005, retrieved from URL=http://web.archive.org/web/20051210130430/http://www.applicad.com.au/ on Apr. 16, 2012, 2 pages.

AppliCad, "RoofScape: Advanced Software for Roof Modeling and Estimating," Learning Guide (English Units), Revision 1.1, Aug. 2007, 48 pages.

Australian Office Action for Australian Application No. 2010201839, dated Apr. 14, 2011, 2 pages.

Autodesk, "Autodesk ImageModeler—Features," retrieved on Sep. 30, 2008, from http:///usa.autodesk.com/adsk/servlet/index?siteID=123112&id=115639 . . . , 1 page.

Automatic House Reconstruction, retrieved on Sep. 29, 2008, from http://www.vision.ee.ethz.ch/projects/Amobe_I/recons.html, 6 pages.

Baillard et al., :Automatic reconstruction of piecwise planar models from multiple views, CVPR99, vol. 2, 1999, pp. 559-565, 7 pages.

Bignone et al., "Automatic Extraction of Generic House Roofs from High Resolution Aerial Imagery," *Proc. ECCV*, 1996, 12 pages.

Canadian Office Action, for Canadian Application No. 2,641,373, dated Jan. 9, 2012, 4 pages.

Chevrier et al., "Interactive 3D reconstruction for urban areas—An image based tool," *CAAD Futures*, 2001, 13 pages.

Ciarcia et al., "Automated Roof Identification Systems and Methods," U.S. Appl. No. 12/590,131, filed Nov. 2, 2009, 74 pages.

Ciarcia et al., "Automated Roof Identification Systems and Methods," Office Action mailed Jan. 9, 2013, for U.S. Appl. No. 12/590,131, 14 pages.

Ciarcia, "Systems and Methods for Point-To-Point Registration Using Perspective Imagery From Independent Sources Without Image Acquisition Metadata," U.S. Appl. No. 13/646,466, filed Oct. 5, 2012, 41 pages.

Debevec et al., "Modeling and Rendering Architecture from Photographs: A hybrid geometry—and image-based approach," *SIGGRAPH conference proceedings*, retrieved from www.cs.berkeley.edu/~malik/papers/debevecTM96.pdf., 1996, 10 pages.

(56) References Cited

OTHER PUBLICATIONS

Delaney, "Searching for Clients From Above—More Small Businesspeople Use Aerial Mapping Services to Scout Potential Customers," *The Wall Street Journal*, Jul. 31, 2007, retrieved on Feb. 25, 2010, from http://online.wsj.com/public/article/SB118584306224482891.html?mod=yahoo_free, 3 pages. Drawing.

Falkner et al., *Aerial Mapping 2nd Edition*, Lewis Publishers (CRC Press LLC), 2002, "Chapter 11—Aerotriangulation," 23 pages.

Faugeras et al., "3-D reconstruction of Urban Scenes from Sequences of Images," Institut National De Recherche En Informatique Et En Automatique, No. 2572, Jun. 1995, 27 pages.

Fritsch, "Introduction into Digital Aerotriangulation," Photogrammetric Week '95, Wichman Verlag, Heidelberg, 1995, pp. 165-171, 7 pages.

GEOSPAN Corporation, "Digital Geo-Referenced Oblique Aerial Imagery Solution EPP-REP No. 8444 5/13," GEO-NY0000868, 2007, 28 pages.

Gülch et al., "On the Performance of Semi-Automatic Building Extraction," In the International Archives of Photogrammetry and Remote Sensing, vol. 23, 8 pages, 1998.

Henricsson et al., "3-D Building Reconstruction with ARUBA: A Qualitative and Quantitative Evaluation," Institute of Geodesy and Photogrammerty, Swiss Federal Institute of Technology, 2001, 13 pages.

International Preliminary Report on Patentability for International Application No. PCT/US2011/023408, mailed Aug. 16, 2012, 7 pages.

International Search Report and Written Opinion for International Application No. PCT/US2013/023502, mailed Apr. 30, 2013, 8 pages.

International Search report for International Application No. PCT/US11/23408, mailed Aug. 11, 2011, 2 pages.

Lueders, "Infringement Allegations by EagleView Technologies," Feb. 10, 2009, 3 pages.

Mann, "Roof with a view," *Contract Journal* 431(6552):29, Nov. 23, 2005, 2 pages.

Miller et al., "Miller's Guide to Framing and Roofing," McGraw Hill, New York, pp. 131-136 and 162-163, 2005, 9 pages.

Minialoff, "Introduction to Computer Aided Design," Apr. 2000, 4 pages.

Noronha et al., "Detection and Modeling of Buildings from Multiple Aerial Images," *IEEE Transactions on Pattern Analysis and Machine Intelligence* 23(5):501-518, 2001, 32 pages.

Pershing et al., "Aerial Roof Estimation System and Method," Notice of Allowance mailed Feb. 3, 2012, for U.S. Appl. No. 12/148,439, 35 pages.

Pershing et al., "Aerial Roof Estimation System and Method," Office Action mailed Apr. 25, 2011, for U.S. Appl. No. 12/148,439, 52 pages.

Pershing et al., "Aerial Roof Estimation System and Method," Office Action mailed Aug. 16, 2010, for U.S. Appl. No. 12/148,439, 47 pages.

Pershing et al., "Aerial Roof Estimation System and Method," Office Action mailed Aug. 25, 2011, for U.S. Appl. No. 12/148,439, 77 pages.

Pershing et al., "Aerial Roof Estimation System and Method," U.S. Appl. No. 60/925,072, filed Apr. 17, 2007, 16 pages.

Pershing et al., "Aerial Roof Estimation System and Methods," Office Action mailed Aug. 28, 2012, for U.S. Appl. No. 13/287,954, 12 pages.

Pershing et al., "Aerial Roof Estimation Systems and Methods," Notice of Allowance mailed Oct. 14, 2011, for U.S. Appl. No. 12/253,092, 30 pages.

Pershing et al., "Aerial Roof Estimation Systems and Methods," Office Action mailed May 10, 2011, for U.S. Appl. No. 12/253,092, 26 pages.

Pershing et al., "Geometric Correction of Rough Wireframe Models Derived From Photographs," U.S. Appl. No. 61/300,414, filed Feb. 1, 2010, 22 pages.

Pershing, "Concurrent Display Systems Anf Methods for Aerial Roof Estimation," Notice of Allowance mailed Feb. 16, 2012, for U.S. Appl. No. 12/467,250, 19 pages.

Pershing, "Concurrent Display Systems Anf Methods for Aerial Roof Estimation," Office Action mailed Sep. 7, 2011, for U.S. Appl. No. 12/467,250, 14 pages.

Pershing, "Concurrnt Display Systems and Methods for Aerial Roof Estimation," Office Action mailed Aug. 28, 2012, for U.S. Appl. No. 13/474,504, 8 pages.

Pershing, "Pitch Determination Systems and Methods for Aerial Roof Estimation," Notice of Allowance mailed Feb. 16, 2012, for U.S. Appl. No. 12/467,244, 20 pages.

Pershing, "Pitch Determination Systems and Methods for Aerial Roof Estimation," Office Action for U.S. Appl. No. 13/438,288, Aug. 24, 2012, 8 pages.

Pershing, "Pitch Determination Systems and Methods for Aerial Roof Estimation," Office Action mailed Aug. 26, 2011, for U.S. Appl. No. 12/467,244, 17 pages.

Pershing, "Systems and Methods for Estimation of Building Floor Area," U.S. Appl. No. 13/385,607, filed Feb. 3, 2012, 41 pages.

Pershing, "Systems and Methods for Estimation of Building Floor Area," U.S. Appl. No. 13/757,712, filed Feb. 1, 2013, 95 pages.

Pershing, "Systems and Methods for Estimation of Building Wall Area," U.S. Appl. No. 13/757,694, filed Feb. 1, 2013, 96 pages.

Pershing, "User Interface Techniques for Roof Estimation," U.S. Appl. No. 61/197,904, filed Oct. 31, 2008, 62 pages.

PhotoModeler, "Measuring & Modeling the Real World," retrieved Sep. 30, 2008, from http://www.photomodeler.com/products/photomodeler.htm, 2 pages.

Pictometry Online, "Government," Oct. 7, 2008, retrieved Aug. 10, 2011, from http://web.archive.org/web/20081007111115/http:/www.pictometry.com/government/prod . . . , 3 pages.

Pictometry, "Electronics Field Study™ Getting Started Guide," Version 2.7, Jul. 2007, 15 pages.

Pictometry, "FAQs," Sep. 22, 2008, retrieved on Aug. 10, 2011, from http://www.web.archive.org/web/20080922013233/http://www.pictometry.com/about_us/faqs.sht . . . , 3 pages.

Pictometry.com, "Frequently Asked Questions," May 24, 2005, reteieved Mar. 28, 2012, from URL=http://web.archive.org/web/20050524205653/http://pictometry.com/faq.asp, 9 pages.

Pictometry.com, "Frequently Asked Questions," retrieved on Apr. 9, 2011, from http://replay.waybackmachine.org/20050801231818/http:///www.pictometry.com/faq.asp, 10 pages.

Pictometry.com, "Frequently Asked Questions," retrieved on Aug. 1, 2005, from http://replay.waybackmachine.org/20050801231818/http:///www.pictometry.com/faq.asp, 10 pages.

Pictometry.com, "Frequently Asked Questions," retrieved on Feb. 10, 2012, from http://replay.waybackmachine.org/20050801231818/http:///www.pictometry.com/faq.asp, 6 pages.

Pictometry.com, "Pictometry Announces Software and Web-based Solution for Engineers, Architects, and Planners," Press Release, Jan. 22, 2004, 3 pages.

Poullis et al., "Photogrammetric Modeling and Image-Based Rendering for Rapid Virtual Environment Creation," http://handle.dtic.mil/100.2/ADA433420, 1998, 7 pages.

Precigeo.com, "Welcome to precigeoRoof," URL=http://web.archive.org/web/20070106063144/roof.precigeo.com, retrieved Apr. 30, 2009, 1 page.

Precigeo.com, "Welcome to precigeo™," "Welcome to precigeoRoof," "Why precigeoRoof," "How precigeoRoof Works," "How precigeoRoof Can Help Me," all retrieved on Feb. 26, 2010, from http://web.archive.org/, pp. 1-5; "Why precigeoRisk Works" and :Welcome to precigeoRisk, retrieved on Aug. 14, 2010, from http://web.archive.org, pp. 6-11, 11 pages total.

Precigeo.com, "Welcome to precigeo™," URL=http://web.archive.org/20080110074814/http://www.precigeo.com, retrieved Feb. 17, 2009, 1 page.

Precigo.com, "How precigeoRoof Works," URL=http://web.archive.org/web/20070107012311/roofprecigeo.com/how-precigeo-roof-works.htm, retrieved Apr. 30, 2009, 1 page.

RoofCAD, "Satellite Takeoff Tutorial-Pitched Roof,", 25 pages.

(56) References Cited

OTHER PUBLICATIONS

Scholze et al., "A Probabilistic Approach to building Roof Reconstruction Using Semantic Labeling," *Pattern Recognition 2449/2002*, Springer Berlin/Heidelberg, 2002, 8 pages.
Schutzberg et al., "Microsoft's MSN Virtual Earth: The Map is the Search Platform," *Directions Magazine*, retrieved Feb. 6, 2009, from http://www.directionsmag.com/article.php?article_id=873&try=1, 10 pages.
Sorcerer software screenshot, modified on Sep. 6, 2012, 1 page.
Transcriptions of points of potential interest in the attached YouTube video titled: "Pictometry Online Demo," retrieved Feb. 25, 2010.
Wolf, *Elements of Photogrammetry*, McGraw-Hill Kogakusha, 1974, "Chapter Fourteen: Aerotriangulation; 41-1 Introduction," pp. 351-352, 3 pages.
Written Opinion for International Application No. PCT/US11/23408, mailed Aug. 11, 2011, 5 pages.
YouTube, "Pictometry Online Demo," DVD, Feb. 25, 2010.
YouTube, "Pictometry Online Demo," retrieved on Feb. 6, 2006, from http://www.youtube.com/watch?v=jURSKo0OD0, 1 page.
Ziegler et al., "3D Reconstruction Using Labeled Image Regions," Mitsubishi Research Laboratories, http://www.merl.com, Jun. 2003, 14 pages.
www.archive.org Web site showing alleged archive of German AeroDach Web Site http://www.aerodach.de from Jun. 13, 2004 (retrieved Sep. 20, 2012) and translations to English, 21 pages.
www.archive.org Web site showing alleged archive of German Aerowest Web site http://aerowest.de/ from Feb. 6, 2006 (retrieved Sep. 20, 2012) and translated to English, 61 pages.
"AeroDach® Online Roof Evaluation Standard Delivery Format and 3D Data File" Document Version 01.00.2002 with alleged publication in 2002, 21 pages.
Noronha et al., "Detection and Modeling of Buildings from Multiple Aerial Images," Institute for Robotics and Intelligent Systems, University of Southern California, Nov. 27, 2001, 33 pages.
Office Action received in Reexamination of U.S. Pat. No. 8,078,436 B2, Supplemental Reexamination Patent, dated Jul. 25, 2013, 72 pages.
Office Action received in Reexamination of U.S. Pat. No. 8,145,578 B2, Supplemental Reexamination Patent, dated Jul. 25, 2013, 24 pages.
"3D Reconstruction," retrieved Oct. 25, 2013, from http://www8cs.umu.se/kurser/TDBD19/V705/reconstruct-4.pdf, 5 pages.
"8. Epipolar Geometry and the Fundamental Matrix," retrieved Oct. 25, 2013, from http://www.robtos.ox.ac.uk/~vgg/hzbook/hzbook1/HZepipolar.pdf, 25 pages.
"Photo Tours Google," Web Search, retrieved Oct. 25, 2013, from http://www.google.com/search?q=photo+tours=google, 2 pages.
Agarwal et al., "Reconstructing Rome," *IEEE Computer* 43(6): 40-47, Jun. 2010.
Agarwal et al., "Building Rome in a Day," *Communications of the ACM* 54(10): 105-112, Oct. 2011.
Agarwala et al., "Interactive Digital Photomontage," ACM SIGGRAPH 2004, Los Angeles, CA, Aug. 2004, 9 pages.
Agarwala et al., "Panoramic Video Textures," SIGGRAPH 2005, Los Angeles, CA, Aug. 2005, 8 pages.
Atkinson, "Therory of Close Range Photogrammetry," Chapter 2, Section 1, Coordinate Transformations, retrieved Oct. 21, 2013, from http://www.lems.brown.edu/vision/people/leymarie/Refs/Photogrammetry/Atkinson90/C . . . , 5 pages.
Australian Office Action, dated Jun. 21, 2013, for Australian Application No. 2011210538, 3 pages.
Australian Office Action, dated Oct. 1, 2013, for Australian Application No. 2010219392, 4 pages.
Azuma et al., "View-dependent refinement of multiresolution meshes with subdivision connectivity," *Proceedings of the Second International Conference on Computer Graphics, Virtual Reality, Visualization, and Interaction (Afigraph* 2003), Capetown, South Africa, Feb. 2003, pp. 69-78.

Bazaraa et al., *Nonlinear Programming Theory and Algorithms*, Second Edition, John Wiley & Sons, Inc., New York, 1993, 330 pages.
Bhat et al., "A Perceptually-Motivated Optimization-Framework for Image and Video Processing," Computer Science & Engineering Technical Report, UW-CSE-08-06-02, University of Washington, Seattle, WA, Jun. 2008, 10 pages.
Bhat et al, "Fourier Analysis of the 2D Screened Poisson Equation for Gradient Domain Problems," ECCV 2008, 14 pages.
Bhat et al., "GradientShop: A Gradient-Domain Optimization Framework for Image and Video Filtering," ACM TOG 29(2), Mar. 2010, 14 pages.
Bhat et al., "Piecewise Image Registration in the Presence of Large Motions," CVPR 2006, New York, NY, Jun. 2006, 7 pages.
Bhat et al., "Using Photographs to Enhance Videos of a Static Scene," Eurographics Symposium on Rendering 2007, 12 pages.
Canadian Office Action, dated Sep. 24, 2013, for Canadian Application No. 2,641,373, 4 pages.
Capell et al., "A Multiresolution Framework for Dynamic Deformations," Computer Science & Engineering Technical Report, UW-CSE-02-04-02, University of Washington, Seattle, WA, Apr. 2002, 8 pages.
Chuang et al., "A Bayesian Approach to Digital Matting," IEEE Computer Vision and Pattern Recognition 2001, Kauai, Hawaii, Dec. 2001, 8 pages.
Chuang et al., "Animating Pictures with Stochastic Motion Textures," SIGGRAPH 2005, Los Angeles, CA, Aug. 2005, 8 pages.
Chuang et al., "Animating Pictures with Stochastic Motion Textures," Technical Report UW-CSE-04-04-02, SIGGRAPH 2005, Los Angeles, CA, Aug. 2005, 7 pages.
Chuang et al., "Environment Matting Extensions: Towards Higher Accuracy and Real-Time Capture," SIGGRAPH 2000, New Orleans, LA, Jul. 24-28, 2000, 11 pages.
Chuang et al., "Environment Matting Extensions: Towards Higher Accuracy and Real-Time Capture," Tech Report, SIGGRAPH 2000, New Orleans, LA, Jul. 24-28, 2000, 10 pages.
Chuang et al., "Shadow Matting and Compositing," SIGGRAPH 2003, San Diego, CA, Jul. 2003, 7 pages.
Ciarcia et al., "Automated Roof Identification Systems and Methods," U.S. Appl. No. 12/590,131, Notice of Allowance, dated Aug. 26, 2013, 9 pages.
Colburn et al., "Image-Based Remodeling," IEEE Transactions on Visualization and Computer Graphics, vol. 19, No. 1, Jan. 2013, 11 pages.
Curless et al., "Better Optical Triangulation Through Spacetime Analysis," Computer Systems Laboratory Technical Report CSL-TR-95-667, Stanford University, Stanford, CA, Apr. 1995, 12 pages.
Curless et al., "Computer model and 3D fax of Happy Buddha," retrieved Oct. 25, 2013, from http://www-graphics.stanford.edu/projects/faxing/happy/, 4 pages.
Curless et al., "A Volumetric Method for Building Complex Models from Range Images," SIGGRAPH '96, New Orleans, LA, Aug. 4-9, 1996, 10 pages.
Curless et al., "Better Optical Triangulation through Spacetime Analysis," 1995 5$^{th}$ International Conference on Computer Vision, Boston, MA, Jun. 20-23, 1995, 8 pages.
Curless, "New Methods for Surface Reconstruction from Range Images," Dissertation, Submitted to the Department of Electrical Engineering and the Committee of Graduate Studies of Stanford University, Jun. 1997, 209 pages.
Curless, "From Range Scans to 3D Models," *ACM SIGGRAPH Computer Graphics* 33(4): 38-41, 1999.
*Eagle View Tech. v. Aerialogics LLC*, Case No. 2:12-cv-00618-RAJ, Prior Art Presentation, Aug. 17, 2012, 61 pages.
ECE 390, Introduction to Optimization, Spring 2004, Introductory Course, retrieved Oct. 25, 2013, from http://liberzon.csl.illinois.edu/04ECE390.html, 1 page.
Ekman, "Price Estimation Tool," Office Action for U.S. Appl. No. 13/843,437, dated Aug. 14, 2013, 9 pages.
Faugeras, "What can be seen in three dimensions with an uncalibrated stereo rig?," *Computer Vision—ECCV* '92: 563-578, 1992. (18 pages).

(56) References Cited

OTHER PUBLICATIONS

Fisher et al., *Dictionary of Computer Vision and Image Processing*, John Wiley & Sons, Ltd., West Sussex, England, 2005, 182 pages.

Furukawa et al., "Manhattan-world Stereo," CVPR 2009, Miami, Florida, Jun. 2009, 8 pages.

Furukawa et al., "Reconstructing Building Interiors from Images," ICCV 2009, Kyoto, Japan, Sep. 2009, 8 pages.

Furukawa et al, "Towards Internet-scale Multi-view Stereo," CVPR 2010, Jun. 2010, 8 pages.

Georgeiv et al., "Spatio-Angular Resolution Tradeoff in Integral Photography," Proceedings of Eurographics Symposium on Rendering, 2006, 10 pages.

Goesele et al., "Multi-View Stereo for Community Photo Collections," Proceedings of ICCV 2007, Rio de Janeiro, Brazil, Oct. 2007, 8 pages.

Goesele et al., "Multi-View Stereo Revisited," CVPR 2006, New York, NY, Jun. 2006, 8 pages.

Goldman et al., "Interactive Video Object Annotation," Computer Science & Engineering Technical Report, UW-CSE-07-04-01, University of Washington, Seattle, WA, Apr. 2007, 7 pages.

Goldman et al., "Schematic Storyboarding for Video Editing and Visualization." SIGGRAPH 2006, Boston, MA, Aug. 2006, 10 pages.

Goldman et al., "Shape and Spatially-Varying BRDFs From Photometric Stereo," IEEE Transactions on Pattern Analysis and Machine Intelligence, vol. 32, No. 6, Jun. 2010, 12 pages.

Goldman et al., "Shape and Spatially-Varying BRDFs From Photometric Stereo," ICCV 2005, Beijing, China, Oct. 2005, 8 pages.

Goldman et al., "Video Object Annotation, Navigation, and Composition," UIST 2008, 10 pages.

Gonzalez et al., *Digital Image Processing*, Addison-Wesley Publishing Company, Inc., Reading, Massachusetts, 1993, 372 pages.

Gupta et al., "Enhancing and Experiencing Spacetime Resolution with Videos and Stills," Computer Science & Engineering Technical Report, UW-CSE-04-08-01, University of Washington, Seattle, WA, Apr. 2008, 6 pages.

Gupta et al., "DuploTrack: A Real-time System for Authoring and Guiding Duplo Block Assembly," UIST 2012, Boston, MA, Oct. 2012, 13 pages.

Gupta et al., "Enhancing and Experiencing Spacetime Resolution with Video and Stills," ICCP 2009, San Francisco, CA, Apr. 2009, 9 pages.

Gupta et al., "Single Image Deblurring Using Motion Density Functions," ECCV 2010, Crete, Greece, Sep. 2010, 14 pages.

Hartley et al., "2.4 A Hierarchy of Transformations", Multiple View Geometry in Computer Vision, Cambridge University Press, Second Edition, 2003, 9 pages.

Hartley et al., "Appendix 6: Iterative Estimation Methods," Multiple View Geometry in Computer Vision, Cambridge University Press, Second Edition, 2003, 34 pages.

Hartley et al., "Invariant and Calibration-Free Methods in Scene Reconstruction and Object Recognition," Final Technical Report, Feb. 28, 1997, 266 pages.

Hartley et al., *Multiple View Geometry in Computer Vision*, Second Edition, Cambridge University Press, Cambridge, England, 2003, 672 pages.

Held et al., "3D Puppetry: A Kinect-based Interface for 3D Animation," UIST 2012, Boston, MA, Oct. 2012, 11 pages.

Hudson, "Merging VRML Models: Extending the Use of Photomodeller," Thesis, in TCC 402, Presented to the Faculty of the School of Engineering and Applied Science, University of Virginia, Mar. 23, 1998, 23 pages.

International Search Report for International Application No. PCT/US2013/023503, dated Apr. 30, 2013, 5 pages.

International Search Report and Written Opinion for International Application No. PCT/US2013/024523, dated Nov. 13, 2013, 15 pages.

Kolman, "Chapter 4, Linear Transformations and Matrices, 4.1: Definition and Examples," Elementary Linear Algebra, Second Edition, Macmillan Publishing Co,. Inc., 1997, 12 pages.

KP Building Products, "Vinyl Siding Estimating and Installation Guide," 2007, 32 pages.

Krainin et al., "Autonomous Generation of Complete 3D Object Models Using Next Best View Manipulation Planning," ICRA 2011, Shanghai, China, May 2011, 7 pages.

Kushal et al., "Photo Tours," 3DimPVT, Oct. 2012, 8 pages.

Levoy et al., "The Digital Michelangelo Project: 3D Scanning of Large Statues," SIGGRAPH 2000, New Orleans, LA, Jul. 24-28, 2000, 14 pages.

Levoy, "The Digital Michelangelo Project," retrieved Oct. 25, 2013, from http://www-graphics.stanford.edu/projects/mich/, 10 pages.

Li et al., "Automated Generation of Interactive 3D Exploded View Diagrams," ACM Transactions on Graphics 27(3), SIGGRAPH 2007, Aug. 2007, 7 pages.

Li et al., "Interactive Cutaway Illustration of Complex 3D Models," ACM Transactions on Graphics 26(3), SIGGRAPH 2007, Aug. 2007, 11 pages.

Mahajan et al., "A Theory of Frequency Domain Invariants: Spherical Harmonic Identities for BRDF/Lighting Transfer and Image Consistency," IEEE Pattern Analysis and Machine Intelligence, 30(2), Feb. 2008, 14 pages.

Mahajan et al., "A Theory of Spherical Harmonic Identities for BRDF/Lighting Transfer and Image Consistency," ECCV 2006, Graz, Austria, May 2006, 14 pages.

Mikhail et al., *Introduction to Modern Photogrammetry*, John Wiley & Sons, Inc., New York, 2001, 247 pages.

Pershing et al., "Aerial Roof Estimation System and Method," Amendment in Response to Office Action received in Reexamination of U.S. Pat. No. 8,145,578 B2, Control No. 96/000,005, filed Oct. 25, 2013, 318 pages.

Pershing et al., "Aerial Roof Estimation System and Method," Amendment in Response to Office Action received in Reexamination of U.S. Pat. No. 8,078,436 B2, Control No. 96/000,004, filed Oct. 25, 2013, 229 pages.

Pershing et al., "Aerial Roof Estimation System and Methods," Office Action dated May 22, 2013, for U.S. Appl. No. 13/287,954, 25 pages.

Pershing, "Concurrent Display Systems and Methods for Aerial Roof Estimation," Office Action dated Jun. 19, 2013, for U.S. Appl. No. 13/474,504, 14 pages.

Pershing, "Pitch Determination Systems and Methods for Aerial Roof Estimation," Office Action dated May 21, 2013, for U.S. Appl. No. 13/438,288, 11 pages.

Pershing et al., "Automated Roof Identification Systems and Methods," Notice of Allowance for U.S. Appl. No. 12/590,131, dated Aug. 26, 2013, 9 pages.

Pershing, "Systems and Methods for Estimation of Building Floor Area," Office Action for U.S. Appl. No. 13/757,712, dated Jul. 18, 2013, 18 pages.

Pershing, "Systems and Methods for Estimation of Building Wall Area," Office Action for U.S. Appl. No. 13/757,694, dated Oct. 8, 2013, 15 pages.

Pershing, "Systems and Methods for Estimation of Building Floor Area," Notice of Allowance for U.S. Appl. No. 13/757,712, dated Nov. 25, 2013, 15 pages.

Pershing, Aerial Roof Estimation Systems and Methods, Notice of Allowance for U.S. Appl. No. 13/287,954, dated Dec. 19, 2013, 40 pages.

Pershing, "Pitch Determination Systems and Methods for Aerial Roof Estimation," Office Action for U.S. Appl. No. 13/438,288, dated Dec. 16, 2013, 23 pages.

Pershing, Concurrent Display Systems and Methods for Aerial Roof Estimation, Office Action for U.S. Appl. No. 13/474,504, dated Dec. 20, 2013, 24 pages.

Pictometry, "Frequently Asked Questions," Dec. 2006, retrieved Apr. 9, 2011, from http://replay.waybackmachine.org/20050801231818/http://www.pictometry.com/faq.asp, 10 pages.

Reddy et al., "Frequency-Space Decomposition and Acquisition of Light Transport under Spatially Varying Illumination," ECCV 2012, Florence, Italy, Oct. 2012, 15 pages.

Seitz et al., "A Comparison and Evaluation of Multi-view Stereo Reconstruction Algorithms," CVPR 2006, New York, NY, Jun. 2006, 8 pages.

(56) References Cited

OTHER PUBLICATIONS

Sengiil, "Extracting Semantic Building Models From Aerial Stereo Images and Convesion to Citygml," Thesis, Istanbul Technical University Institute of Science and Technology, May 2010, 138 pages.
Shan et al., "Refractive Height Fields from Single and Multiple Images," CVPR 2012, Providence, RI, Jun. 2012, 8 pages.
Shan et al., "Refractive Height Fields from Single and Multiple Images," CVPR 2012, Providence, RI, Jun. 2012, poster, 1 page.
Steuer, "Heigh Snakes: 3D Building Reconstruction from Aerial Image and Laser Scanner Data," Joint Urban Remote Sensing Event (JURSE 2011), Munich, Germany, Apr. 11-13, 2011, pp. 113-116.
University of Washington, College of Arts & Sciences, Mathematics, Course Offerings, Autumn Quarter 2013 and Winter Quarter 2014, retrieved Oct. 25, 2013, from http://www.washington.edu/students/crscat/math.html, 16 pages.
Wattenberg et al., "Area, Volume, and Torque in Three Dimensions," retrieved on Sep. 24, 2013, from http://www.math.montana.edu/frankw/ccp/multiworld/twothree/atv/learn.htm, 14 pages.
Weeks et al., "A Real-Time, Multichannel System with Parallel Digital Signal Processors," *Proceedings of IEEE International Conference on Acoustics, Speech and Signal Processing (ICASSP 1990)* 3: 1787-1790, Apr. 1990.
Wood et al., "Surface Light Fields for 3D Photography," SIGGRAPH 2000, New Orleans, LA, Jul. 24-28, 2000, 10 pages.
Written Opinion for International Application No. PCT/US2013/023503, dated Apr. 30, 2013, 4 pages.
Written Opinion for International Application No. PCT/US2013/023502, dated Apr. 30, 2013, 3 pages.
Wu et al., "Multicore Bundle Adjustment," CVPR 2011, Colorado Springs, CO, Jun. 2011, 8 pages.
Wu et al., "Schematic Surface Reconstruction," CVPR 2012, Providence, RI, Jun. 2012, 1 page.
www.archive.org Web site showing alleged archive of PhotoModeler Web Site http://www.photomodeler.com/pmpro08.html from Feb. 9, 2006 (retrieved Oct. 21, 2013), 4 pages.
YouTube, "Pictometry Online Webinar for MAIA Members," uploaded Apr. 8, 2011, retrieved from http://www.youtube.com/watch?v=RzAXK2avqQQ, 2 pages.
Zhang et al., "Rapid Shape Acquisition Programming," International Symposium Using Color Structured Light and Multi-Pass Dynamic on 3D Data Processing Visualization and Transmission, Padua, Italy, Jun. 2002, 13 pages.
Zhang et al., "Shape and Motion Under Varying Illumination: Unifying Structure from Motion, Photometric Stereo, and Multi-view Stereo," ICCV 2003, Nice, France, Oct. 2003, 8 pages.
Zhang et al., "Spacetime Stereo: Shape Recovery for Dynamic Scenes," CVPR 2003, Madison, Wisconsin, Jun. 2003, 8 pages.
Zheng et al., "A Consistent Segmentation Approach to Image-based Rendering," Technical Report CSE-09-03-02, 2002, 8 pages.
Zheng et al., "Parallax Photography: Creating 3D Cinematic Effects form Stills," Proceedings of Graphics Interface 2009, Kelowna, BC, CA, May 2009, 8 pages.
Zongker et al., "Environment Matting and Compositing," SIGGRAPH '99, Los Angeles, CA, Aug. 9-13, 1999, 10 pages.
"R2V User's Manual, Advanced Raster to Vector Conversion Software," Publicly available Sep. 16, 2000, Able Software Corp., Lexington, MA, 164 pages.
"Updating App Resources from server in iOS," Mar. 11, 2013, retrieved from http://stackoverflow.com/questions/15334155/updating-app-resources-from-server-in-ios, 2 pages.
Appli-cad, "World Class Technology Leading the Way in Roofing Software—Product Bulletin,"Nov. 2002, 98 pages.
Avrahami et al., "Extraction of 3D Spatial Polygons Based on the Overlapping Criterion for Roof Extraction From Aerial Images," CMRT05. IAPRS, vol. XXXVI, Part 3/W24, pp. 43-48, Vienna, Austria, Aug. 29-30, 2005. (6 pages).
Bertan et al., "Automatic 3D Roof Reconstruction using Digital Cadastral Map, Architectural Knowledge and an Aerial Image," IEEE International Conference on Geoscience and Remote Sensing Symposium, Sep. 2006, pp. 1407-1410, 4 pages.
Charaniya et al., "3D Urban Reconstruction from Aerial LiDAR data," Computer Science, University of California, Santa Cruz, pp. 1-43, IEEE, 2004.
Collins et al., "The Ascender System: Automated Site Modeling from Multiple Aerial Images," *Computer Vision and Image Understanding* 72(2):143-162, Nov. 1998.
Declaration of Harold Schuch, in re Inter Partes Review of U.S. Pat. No. 8,078,436, dated Feb. 5, 2016, 36 pages.
Ex Parte Reexamination Certificate (11th), Ex Parte Reexamination Ordered under 35 U.S.C. 257, for U.S. Pat. No. 8,078,436 C1, Pershing et al., "Aerial Roof Estimation Systems and Methods," certificate dated Aug. 27, 2014, 4 pages.
Forlani et al., "Complete classification of raw LIDAR data and 3D reconstruction of buildings," *Pattern Anal Applic* 8:357-374, 2006.
Gleicher, "Image Snapping," Advanced Technology Group, Apple Computer, Inc., 1995, 8 pages.
Hsieh, "Design and Evaluation of a Semi-Automated Site Modeling System," Digital Mapping Laboratory, School of Computer Science, Carnegie Mellon University, Pittsburgh, PA, CMU-CS-95-195, Nov. 1995, 84 pages.
Jaynes et al., "Recognition and reconstruction of buildings from multiple aerial images," *Computer Vision and Image Understanding* 90:68-98, 2003.
Labe et al., "Robust Techniques for Estimating Parameters of 3D Building Primitives," International Society for Photogrammetry and Remote Sensing vol. 32, Part 2, Commission II, Proceedings of the Commission II Symposium, Data Integration Techniques, Jul. 13-17, 1998, 8 pages.
McGlone et al., "Projective and Object Space Geometry for Monocular Building Extraction," Digital Mapping Laboratory, School of Computer Science, Carnegie Mellon University, Pittsburgh, PA, pp. 54-61, IEEE, 1994.
McKeown et al., "Chapter 9: Feature Extraction and Object recognition, Automatic Cartographic Feature Extraction Using Photogrammetric Principles," in Digital Photogrammetry: An Addendum to the Manual of Photogrammetry, Greve, C., (ed.), Bethesda, Maryland, American Society for Photogrammetry and Remote Sensing, 1996, 19 pages.
Noronha et al., "Detection and Modeling of Buildings from Multiple Aerial Images," *IEEE Transactions on Pattern Analysis and Machine Intelligence* 23(5):2-32, May 2001.
Perlant et al., "Scene Registration in Aerial Image Analysis," Photogrammetric Engineering and Remote Sensing 56(4):481-493, Apr. 1990.
Pershing et al., "Aerial Roof Estimation Systems and Methods," Non-Final Office Action, dated Mar. 29, 2016 for U.S. Appl. No. 14/195,543, 25 pages.
Pershing et al., "Property Management on a Smartphone," Non-Final Office Action, dated Apr. 1, 2016, for U.S. Appl. No. 13/844,552, 37 pages.
Pershing et al., "Aerial Roof Estimation Systems and Methods," Amendment, filed Oct. 25, 2013, for U.S. Pat. No. 8,078,436 B2, Control No. 96/000,004, 225 pages.
Pershing et al., Petition for Inter Partes Review of U.S. Pat. No. 8,078,436, dated Dec. 13, 2011, "Aerial Roof Estimation Systems and Methods," dated Feb. 8, 2016, 66 pages.
Pictometry, "Electronic Field Study™ User Guide," Version 2.7, Jul. 2007, 508 pages. (537 pages).
Shahrabi, "Automatic Recognition and 3D Reconstruction of Buildings through Computer Vision and Digital Photogrammetry," Institut für Photogrammetrie der Universität Stuttgart, 2000. pp. 5-110.
Australian Office Action, dated Oct. 30, 2014, for Australian Application No. 2013204089, 5 pages.
Pershing et al., "Aerial Roof Estimation System and Method," Office Action for Reexamination of U.S. Pat. No. 8,145,578 B2, Control No. 96/000,005, dated Apr. 16, 2014, 59 pages.
Pershing et al., "Aerial Roof Estimation System and Method," Amendment for U.S. Appl. No. 12/148,439, filed Jan. 18, 2011, 43 pages.

(56) References Cited

OTHER PUBLICATIONS

Pershing et al., "Aerial Roof Estimation System and Method," Amendment for U.S. Appl. No. 12/148,439, filed Jul. 25, 2011, 10 pages.
Pershing et al., "Aerial Roof Estimation System and Method," Amendment for U.S. Appl. No. 12/148,439, filed Nov. 23, 2011, 24 pages.
Pershing et al., "Aerial Roof Estimation Systems and Methods," Amendment for U.S. Appl. No. 12/253,092, filed Aug. 10, 2011, 15 pages.
Pershing et al., "Aerial Roof Estimation Systems and Methods," Amendment for U.S. Appl. No. 13/287,954, filed Feb. 28, 2013, 14 pages.
Pershing et al., "Aerial Roof Estimation Systems and Methods," Amendment for U.S. Appl. No. 13/287,954, filed Nov. 22, 2013, 33 pages.
"About the SPIE Digital Library," SPIE, retrieved from http://spiedigitallibrary.org/ss/about.aspx, retrieved on Sep. 7, 2016, 3 pages.
Affidavit Attesting to the Accuracy of the Attached "Aerowest" Translation Under 37 C.F.R. §§ 42.2, 42.63(b), and/or 1.68, Mar. 18, 2013, 1 page.
ASPRS Bookstore—Manuals, "Digital Photogrammetry: An Addendum to the Manual of Photogrammetry, Greve, ed., 1996," retrieved from http://web.archive.org/web/19980116141702/http:/www.asprs.org/asprs/publications/bookstore/mamanuals.html, retrieved on Oct. 3, 2016, 6 pages.
Australian Office Action, dated Oct. 1, 2014, for Australian Application No. 2013203507, 3 pages.
Brooks et al., "A Review of Position Tracking Methods," $1^{st}$ International Conference on Sensing Technology, Nov. 21-23, 2005, pp. 54-59. (6 pages).
Canadian Office Action, dated Mar. 24, 2014, for Canadian Application No. 2,703,423, 2 pages.
Cohasset, "Town Report," 2008, pp. 1-3 and 27. (4 pages).
Decision—Denying Petitioner's Request for Rehearing 37 C.F.R. § 42.71(d), Case IPR2016-00582, *Xactware Solutions, Inc.*, v. *Eagle View Technologies, Inc.*, U.S. Pat. No. 8,078,436 B2, dated Sep. 21, 2016, 4 pages.
Decision—Denying Institution of Inter Partes Review 37 C.F.R. § 42.108, Case IPR2016-00582, *Xactware Solutions, Inc.*, v. *Eagle View Technologies, Inc.*, U.S. Pat. No. 8,078,436 B2, dated Aug. 16, 2016, 8 pages.
Declaration of Lynn Berard, In re Inter Partes Review of U.S. Pat. No. 8,078,436, dated Aug. 24, 2016, 4 pages.
Declaration of Harold Schuch, In re Inter Partes Review of U.S. Pat. No. 8,078,436, dated Sep. 12, 2016, 37 pages.
Declaration of Harold Schuch, In re Inter Partes Review of U.S. Pat. No. 8,078,436, dated Oct. 4, 2016, 40 pages.
FirstSearch: WorldCat Detailed Record (Staff View), "Digital Photogrammetry," retrieved from http://www.firstsearch.oclc.org/WebZ/FSFETCH?fetchtype=fullrecord:sessionid=fsappl-3 . . . , retrieved on Oct. 3, 2016, 8 pages.
Geospatial Information Systems Council, "Pictometry: Oblique Imagery training," 2009, retrieved from http://www.ct.gov/gis/cwp/view.asp?q=425874&a=3033&pp=3, retrieved on Sep. 7, 2016, 3 pages.
GIS Working Group Meeting Minutes, Jan. 22, 2007, 17 pages.
Henricsson et al., "Project Amobe: Strategies, Current Status and Future Work," International Archives of Photogrammetry and Remote Sensing, vol. XXXI, Part B3, Vienna, pp. 321-330, 1996. (10 pages).
Hsieh, "SiteCity: A Semi-Automated Site Modelling System," IEEE, pp. 499-506, 1996.
ISPRS Archives—vol. XXXVI-3/W24, 2005, retrieved from http://www.isprs.org/proceedings/XXXVI/3-W24/ retrieved on Sep. 7, 2016, 5 pages.
LAR-IAC2 Product Guide, for the Los Angeles Region Imagery Acquisition Consortium (LAR-IAC) Program, 2008-2009, 16 pages.
LARIAC1 Pictometry Training, 2009, retrieved from http://egis3.lacounty.gov/dataportal/lariac/lariac-archives/lariac1-archive/lariac1-pictometr . . . , retrieved Sep. 15, 2016, 2 pages.
"Los Angeles County Extends its License Agreement with Pictometry for New Oblique Aerial Photos," Mar. 7, 2006, retrieved from http://www.directionsmag.com/pressreleases/los-angeles-county-extends-its-license-agree . . . , retrieved on Sep. 15, 2016, 5 pages.
MARC 21 Bibliographic, "005—Data and Time of Latest Transaction (NR)," Library of Congress, Feb. 1999, 2 pages.
MARC Record, for Hsieh, "Design and Evaluation of a Semi-Automated Site Modeling System," Digital Mapping Laboratory, School of Computer Science, Carnegie Mellon University, Pittsburgh, PA, CMU-CS-95-195, Nov. 1995, 84 pages, retrieved on Aug. 17, 2016, retrieved from http://search.library.cm.u.edu/vufind/Record/465462/Details#tabnav, 3 pages.
Merriam-Webster, "Compass Bearing," Definition, 2 pages.
Notice of Allowance, dated Feb. 23, 2012, for U.S. Appl. No. 12/148,439, Pershing et al., "Aerial Roof Estimation System and Method," 22 pages.
Notice of Allowance, dated Aug. 26, 2016, for U.S. Appl. No. 14/195,543, Pershing et al., "Aerial Roof Estimation Systems and Methods," 23 pages.
Notice of Intent to Issue Reexam Certificate, dated Apr. 16, 2014, for U.S. Reexamination Application No. 96/000,004, Pershing et al., "Aerial Roof Estimation System and Method," 39 pages.
Office Action, dated Sep. 12, 2016, for U.S. Appl. No. 13/954,832, Pershing et al., "Aerial Roof Estimation System and Method," 34 pages.
Perlant et al., "Scene registration in aerial image analysis," date of original version: 1989, retrieved from http://repository.cmu.edu/compsci/1859, retrieved on Sep. 7, 2016, 3 pages.
Perlant et al., "Scene Registration in Aerial Image Analysis," 1989, retrieved from http://proceedings.spiedigitallibrary.org/proceedings.aspx?articleid=1257182, retrieved on Sep. 7, 2016, 3 pages.
Pershing et al., "Aerial Roof Estimation System and Method," Amendment, filed Apr. 25, 2016, for U.S. Reexamination Application No. 96/000,005, 53 pages.
Pershing et al., "Aerial Roof Estimation System and Method," Amendment, filed Sep. 16, 2014, for U.S. Reexamination Application No. 96/000,005, 17 pages.
Pershing et al., "Aerial Roof Estimation System and Method," Amendment, filed Aug. 18, 2014, for U.S. Reexamination Application No. 96/000,005, 164 pages.
Pershing et al., "Automated Techniques for Roof Estimation," U.S. Appl. No. 61/197,072, filed Oct. 31, 2008, 32 pages.
Pershing et al., "Aerial Roof Estimation Systems and Methods," Amendment, filed Jun. 29, 2016, for U.S. Appl. No. 14/195,543, 13 pages.
Petition for Inter Partes Review of U.S. Pat. No. 8,078,436, dated Dec. 13, 2011, "Aerial Roof Estimation Systems and Methods," dated Sep. 12, 2016, 67 pages.
Petition for Inter Partes Review of U.S. Pat. No. 8,078,436, dated Dec. 13, 2011, "Aerial Roof Estimation Systems and Methods," dated Oct. 5, 2016, 68 pages.
Petitioner's Motion for Pro Hac Vice Admission of Scott S. Christie Under 37 C.F.R. § 42.10, *Xactware Solutions, Inc.* v. *Eagle View Technologies. Inc.*, Case IPR2016-01775, U.S. Pat. No. 8,078,436, dated Oct. 24, 2016, 6 pages.
Petitioner's Request for Rehearing Pursuant to 37 C.F.R. §§ 42.71 (c) and (d), Case IPR2016-00582, *Xactware Solutions, Inc.*, v. *Eagle View Technologies, Inc.*, U.S. Pat. No. 8,078,436 B2, dated Sep. 9, 2016, 12 pages.
"Pictometry Announces Technical Advancements for GIS Professionals," Dec. 7, 2006, retrieved from http://www.directionsmag.com/pressreleases/pictometry-announces-technical-advancements . . . , retrieved on Sep. 7, 2016, 11 pages.
"Pictometry Announces Technical Advancements for GIS Professionals," Dec. 5, 2006, retrieved from http://gisuser.com/2006/12/pictometry-announces-technical-advancements-for-gis-professi . . . , retrieved on Sep. 15, 2016, 16 pages.
Pictometry License Guidelines, Jan. 26, 2005, 3 pages.
Pictometry, "Power Point Presentation," Apr. 19, 2007, 21 pages.

(56) References Cited

OTHER PUBLICATIONS

Pictometry, "Welcome to Your End User Training Power Point Presentation," 47 pages.
Pictometry Administrative Training, Power Point Presentation, 40 pages.
Pictometry Administrative Training, Power Point Presentation, Metadata, 2 pages.
Pictometry Administrative Training, Handout, 2 pages.
Pictometry, "Oblique Image Library Instructions—Information for Utilization," Oct. 2008, 8 pages.
Portions of File History, dated Oct. 25, 2013, for U.S. Reexamination Application No. 96/000,004, Pershing et al., "Aerial Roof Estimation System and Method," 225 pages.
"Proceedings of SPIE," SPIE, retrieved from http://proceedings.spiedigitallibrary.org/conferenceproceedings.aspx, retrieved on Sep. 7, 2016, 3 pages.
Table containing all archives of The International Archives of the Photogrammetry, Remote Sensing and Spatial Information Sciences, retrieved from http://www.isprs.org/publications/archives.aspx, retrieved on Sep. 7, 2016, 11 pages.
Kennedy, Amendment and Response to the USPTO regarding U.S. Appl. No. 12/364,506, dated Sep. 4, 2012.
USPTO, Notice of Non-Compliant Amendment regarding U.S. Appl. No. 12/364,506; dated Sep. 18, 2012.
Kennedy, Amendment and Response to the USPTO regarding U.S. Appl. No. 12/364,506, dated Oct. 18, 2012.
USPTO, Notice of Allowance regarding U.S. Appl. No. 12/364,506; dated Dec. 12, 2012.
Kennedy, Provisional U.S. Appl. No. 61/047,086, dated Apr. 28, 2008.
Kennedy, Provisional U.S. Appl. No. 61/025,431, dated Feb. 13, 2008.
Xactware Solutions, Inc., and Verisk Analytics, Inc., Defendant's Second Amended Answer, Affirmative Defenses, Counterclaims, and Jury Demand in response to Complaint for infringement of U.S. Patents including U.S. Pat. No. 8,078,436 in litigation (*Eagle View Technologies, Inc., and Pictometry International Corp.* v. *Xactware Solutions, Inc., and Verisk Analytics, Inc.*) in the United States District Court District of New Jersey, case number njd-1-15-cv-07025-RBK-JS, dated Feb. 28, 2017 (struck from court record Mar. 1, 2017).
USPTO, Final Office Action in Ex Parte Reexamination Control No. 96/000,005 regarding U.S. Pat. No. 8,145,578 to Pershing et al.; dated Nov. 25, 2016.
USPTO, Ex Parte Reexamination Interview Summary for Control No. 96/000,005 regarding U.S. Pat. No. 8,145,578 to Pershing et al.; dated Jan. 19, 2017.
Eagle View Technologies, Inc., Response in Ex Parte Reexamination Control No. 96/000,005 regarding U.S. Pat. No. 8,145,578 to Pershing et al.; dated Jan. 25, 2017.
USPTO, Advisory Action in Ex Parte Reexamination Control No. 96/000,005 regarding U.S. Pat. No. 8,145,578 to Pershing et al.; dated Feb. 17, 2017.
Eagle View Technologies, Inc., Response to USPTO regarding U.S. Appl. No. 13/954,832, dated Dec. 12, 2016.
USPTO, Office Action regarding U.S. Appl. No. 15/345,358, dated Jan. 19, 2017.
Kwak, Tae-Suk et al., "Registration of Aerial Imagery and Aerial LiDAR Data Using Centroids of Plane Roof Surfaces as Control Information", Sep. 2006, Surveying and Geo-Spatial Information Engineering, KSCE Journal of Civil Engineering, vol. 10, No. 5.
Baillard, C. et al., "A Plane-Sweep Strategy for the 3D Reconstruction of Buildings from Multiple Images", 2000, International Archives of Photogrammetry and Remote Sensing, vol. XXXIII, Supplement B4.
Eagle View Technologies, Inc., Patent Owner's Preliminary Response to Petition to institute IPR of U.S. Pat. No. 8,078,436 in IPR2016-01775, filed Jan. 19, 2017.
Xactware Solutions, Inc., "Nov. 30, 2016 Motion to Stay Hearing Slides (Case No. 15-cv-1725)", Exhibit 2001 of Patent Owner's Preliminary Response to Petition to institute IPR of U.S. Pat. No. 8,078,436 in IPR2016-01775E filed Jan. 19, 2017.
Eagle View Technologies, Inc. and Pictometry International Corp., "Sep. 23, 2015 Complaint (Case No. 15-cv-1725)", Exhibit 2003 of Patent Owner's Preliminary Response to Petition to institute IPR of U.S. Pat. No. 8,078,436 in IPR2016-01775, filed Jan. 19, 2017.
Eagle View Technologies, Inc., "Website entitled CMU Libraries: Holdings: Design and evaluation of a semi-automated site", Exhibit 2005 of Patent Owner's Preliminary Response to Petition to institute IPR of U.S. Pat. No. 8,078,436 in IPR2016-01775, filed Jan. 19, 2017.
Eagle View Technologies, Inc., "Declaration of Jared Barcenas, Jan. 19, 2017", Exhibit 2006 of Patent Owner's Preliminary Response to Petition to institute IPR of U.S. Pat. No. 8,078,436 in IPR2016-01775, filed Jan. 19, 2017.
Eagle View Technologies, Inc., "U.S. Pat. No. 8,078,436 Office Action in Ex Parte Reexamination, dated Jul. 25, 2013", Exhibit 2007 of Patent Owner's Preliminary Response to Petition to institute IPR of U.S. Pat. No. 8,078,436 in IPR2016-01775, filed Jan. 19, 2017.
Eagle View Technologies, Inc., Patent Owner's Supplemental Preliminary Response to Petition to institute IPR of U.S. Pat. No. 8,078,436 in IPR2016-01775, filed Feb. 15, 2017.
Eagle View Technologies, Inc., Patent Owner's Preliminary Response to Petition to institute IPR of U.S. Pat. No. 8,078,436 in IPR2017-00021, filed Jan. 23, 2017.
Xactware Solutions, Inc., "Feb. 9, 2016 Defendants Invalidity Contentions (Case No. 15-cv-7025)", Exhibit 2001 of Patent Owner's Preliminary Response to Petition to institute IPR of U.S. Patent No. 8,078,436 in IPR2017-00021, filed Jan. 23, 2017
Eagle View Technologies, Inc. and Pictometry International Corp., "Sep. 23, 2015 Complaint (Case No. 15-cv-7025)", Exhibit 2002 of Patent Owner's Preliminary Response to Petition to institute IPR of U.S. Pat. No. 8,078,436 in IPR2017-00021, filed Jan. 23, 2017.
Eagle View Technologies, Inc., "Nov. 30, 2016 Hearing Transcript (Case No. 15-cv-7025)", Exhibit 2004 of Patent Owner's Preliminary Response to Petition to institute IPR of U.S. Pat. No. 8,078,436 in IPR2017-00021, filed Jan. 23, 2017.
Eagle View Technologies, Inc., "Nov. 1, 2016 Deposition Transcript of H. Schuch", Exhibit 2004 of Patent Owner's Preliminary Response to Petition to institute IPR of U.S. Pat. No. 8,078,436 in IPR2017-00021, filed Jan. 23, 2017.
USPTO Patent Trial and Appeal Board; Decision Denying Institution of Inter Partes Review 2017-00021, Paper 9, filed Apr. 14, 2017.
Xactware Solutions, Inc., and Verisk Analytics, Inc., Defendant's Second Amended Answer, Affirmative Defenses, Counterclaims, and Jury Demand in response to Complaint for infringement of U.S. Patents including U.S. Pat. No. 8,078,436 in litigation (*Eagle View Technologies, Inc., and Pictometry International Corp.* v. *Xactware Solutions, Inc., and Verisk Analytics, Inc.*) in the United States District Court District of New Jersey, case No. njd-1-15-cv-07025-RBK-JS dated May 18, 2017.
USPTO, Office Action regarding U.S. Appl. No. 13/954,832, dated Apr. 20, 2017.
Kugler, Markman Order regarding U.S. Patents including U.S. Pat. No. 8,078,436, *Eagle View Technologies, Inc., and Pictometry International Corp.* v. *Xactware Solutions, Inc., and Verisk Analytics, Inc.*, in the United States District Court District of New Jersey, case No. njd-1-15-cv-07025-RBK-JS, dated Dec. 5, 2017.
Eagle View Technologies, Inc., Amended Appeal Brief in Ex Parte Reexamination Control No. 96/000,005 regarding U.S. Pat. No. 8,145,578 to Pershing et al.; filed Jul. 27, 2017.
USPTO, Examiner Answer to Appeal Brief in Ex Parte Reexamination Control No. 96/000,005 regarding U.S. Pat. No. 8,145,578 to Pershing et al.; dated Aug. 29, 2017.
Eagle View Technologies, Inc., Reply Brief in Ex Parte Reexamination Control No. 96/000,005 regarding U.S. Pat. No. 8,145,578 to Pershing et al.; filed Oct. 30, 2017.
Eagle View Technologies, Inc., Response to USPTO Office Action regarding U.S. Appl. No. 13/954,832; filed Oct. 19, 2017.

(56) References Cited

OTHER PUBLICATIONS

Vural et al., "Eastern Black Sea Region-A sample of modular design in the vernacular architecture," Science Direct, Building and Environment 42 (2007). pp. 2746-2761.

USPTO, Office Action regarding U.S. Appl. No. 13/954,832, dated Jan. 25, 2018.

Eagle View Technologies, Inc., "Brief in Support of Motion for Partial Summary Judgement that the Sungevity Reference is Not Prior Art to U.S. Pat. No. 8,078,436", *Eagle View Technologies, Inc., and Pictometry International Corp. v. Xactware Solutions, Inc., and Verisk Analytics, Inc.*, in the United States District Court District of New Jersey, case No. njd-1-15-cv-07025-RBK-JS, dated Sep. 20, 2018.

Xactware Solutions, Inc. et al., "Memorandum in Opposition to Eagle View Technologies, Inc.'s Motion for Partial Summary Judgement that the Sungevity Reference is Not Prior Art to U.S. Pat. No. 8,078,436", *Eagle View Technologies, Inc., and Pictometry International Corp. v. Xactware Solutions, Inc., and Verisk Analytics, Inc.*, in the United States District Court District of New Jersey, case No. njd-1-15-cv-07025-RBK-JS, dated Oct. 23, 2018.

Xactware Solutions, Inc. et al., "Memorandum in Support of Their Motion for Summary Judgement of Unpatentability" regarding U.S. Patents including U.S. Pat. No. 8,078,436, *Eagle View Technologies, Inc., and Pictometry International Corp. v. Xactware Solutions, Inc., and Verisk Analytics, Inc.*, in the United States District Court District of New Jersey, case No. njd-1-15-cv-07025-RBK-JS dated Sep. 20, 2018.

Eagle View Technologies, Inc., "Opening Brief in Opposition of Defendants' Motion for Summary Judgement of Unpatentability", regarding U.S. Patents including U.S. Pat. No. 8,078,436, *Eagle View Technologies, Inc., and Pictometry International Corp. v. Xactware Solutions, Inc., and Verisk Analytics; Inc.*, in the United States District Court District of New Jersey, case No. njd-1-15-cv-07025-RBK-JS, dated Oct. 23, 2018.

\* cited by examiner

1234 Main Street, Redmond, WA

Order: 2468

<Customer Name Here>

4/16/2008

1234 Main Street, Redmond, WA

Order: 2468    Copyright © 2008 Eagle View Technologies, Inc.    1 of 6

103

AERIAL ROOF ESTIMATION SYSTEM AND METHOD

CROSS REFERENCE TO RELATED APPLICATIONS

This application is a continuation of U.S. patent application Ser. No. 12/148,439, filed Apr. 17, 2008, now pending, which claims benefit of U.S. Provisional Application No. 60/925,072 filed on Apr. 17, 2007, which applications are incorporated herein by reference in their entirety.

BACKGROUND OF THE INVENTION

1. Field of the Invention

This invention relates to systems and methods for estimating construction projects, and more particularly, to such systems and methods that allow estimates involving roofs on buildings to be created remotely.

2. Description of the Related Art

The information provided below is not admitted to be part of the present invention, but is provided solely to assist the understanding of the reader.

Homeowners typically ask several roofing contractors to provide written estimates to repair or replace a roof on a house. Heretofore, the homeowners would make an appointment with each roofing contractor to visit the house to determine the style of roof, take measurements, and to inspect the area around the house for access and cleanup. Using this information, the roofing contractor then prepares a written estimate and then timely delivers it to the homeowner. After receiving several estimates from different roofing contractors, the homeowner then selects one.

There are factors that impact the roofing contractor's ability to provide a timely written estimate. One factor is the size of the roof contractor's company and the location of the roofing jobs currently underway. Most roof contractors provide roofing services and estimates to building owners over a large geographical area. Larger roof contractor companies hire one or more trained individuals who travel throughout the entire area providing written estimates. With smaller roofing contractors, the owner or a key trained person is appointed to provide estimates. With both types of companies, roofing estimates are normally scheduled for buildings located in the same area on a particular day. If an estimate is needed suddenly at a distant location, the time for travel and the cost of commuting can be prohibitive. If the roofing contractor is a small company, the removal of the owner or key person on a current job site can be time prohibitive.

Another factor that may impact the roofing contractor's ability to provide a written estimate is weather and traffic.

Recently, solar panels have become popular. In order to install solar panels, the roof's slope, geometrical shape, and size as well as its orientation with respect to the sun all must be determined in order to provide an estimate of the number and type of solar panels required. Unfortunately, not all roofs on a building are proper size, geometrical shape, or orientation for use with solar panels.

What is needed is a system that allows a roof to be quickly and easily measured and that does not require the estimator to physically travel to the building to take measurements. Such measurements can then be used to prepare an estimate to repair or replace the roof or install equipment thereon.

SUMMARY OF THE INVENTION

These and other objects are met by the system and method disclosed herein that allows a company that needs the sizes, dimensions, slopes and orientations of the roof sections on a building in order to provide a written estimate. The system includes the use of a roof estimating software program and a location-linked, image file database. During use, the physical address or location information of the building is inputted into the program which then presents aerial images of roof sections on the building at the specific address location. An overhead aircraft, a balloon, or satellite may produce the aerial images. An image analysis and calibration is then performed either manually or via a software program that determines the geometry, the slopes, the pitch angles, and the outside dimensions of the roof sections. The images may also include the land surrounding the roof sections and building which the estimating company can use to factor in additional access or clean-up costs.

In the first embodiment of the system, the roof company is contacted by a potential customer requesting an estimate for repair or replacement of a roof on their building. The roof company uses a local computer with an estimating software program loaded into its working memory to access an image file database located on the computer or on a remote server connected via a wide area network to the local computer. The image file database contains image files of various buildings in the roof company's service area. When a request for an estimate is received from a potential customer, the roof company enters the customer's address into the software program and aerial images of the building are then presented to the roof company. The roof company then manually measures or uses a roof estimation software program to determine the slopes, dimensions, and other relevant geometric information of the roof sections on the buildings. From these determinations, the overall shape, slopes and square footage of the roof sections are determined and a report is produced. After the report has been prepared, the images are reviewed again for special access and cleanup tasks which can be added to the final estimate before transmission to the potential customer.

In another embodiment, the roof estimate software program and image file database are both stored on one or more remote computers and accessed by the roof company via a wide area network. The roof company uses an assigned user name and password to log onto the website and access the computer. After logging on, the roof company logs then submits the new customer's address, other relevant job related information, and a request for a report from the roof estimation service. An estimation service associated with the website uses the address information to obtain the images of the roof sections on the building(s) and uses the roof estimation software program and calibration module to determine the relevant geometry, pitch angles, dimensions, and surface areas of the building's roof. The service then produces and sends a report to the roof company. The company then uses the report to prepare a final estimate that is then delivered to the potential customer.

In another embodiment of the system, a roof estimating website is designed to receive requests for roof estimates directly from potential customers in a region. The estimation service that owns and operates the website is associated with various roof companies that provide roof-related services in the region serviced by the website. When a potential customer contacts the website and requests an estimate for a roof repair, replacement or installation of equipment, the potential customer's name, address, and contact information is first submitted on the website. The estimation service representative, enters the address of the building into the roof estimation software program. The aerial images of the buildings are then obtained and analyzed by the service representative to extract the relevant geometric information about the structures. A report containing the geometric information obtained from the aerial images and other relevant project related information supplied by the potential customer are transmitted to roof companies associated with the estimation service. The roof company reviews the information then prepares an estimate which then can be uploaded to the roof estimating website server which then forwards the estimate to the potential customer, or sends from the roof company directly via email, fax or mail to the potential customer.

In another embodiment, a service associated with the roof estimate website uses the image file database and roof estimate software to pre-emptively calculate and store the dimensions, areas, pitch angles, and other relevant geometric information about the buildings and structures located within a geographic region. This pre-calculated information can then be used by any of the previously mentioned embodiments to accelerate the process of obtaining roof estimates within that geographic region.

It should be understood, that the system and method described herein may be used by any individual or company that would find the calculation of the size, geometry, pitch and orientation of the roof of a building from aerial images of the building useful. Such companies may include roofing companies, solar panel installers, roof gutter installers, awning companies, HVAC contractors, general contractors and insurance companies.

DESCRIPTION OF THE PREFERRED EMBODIMENT(S)

Figure 3:
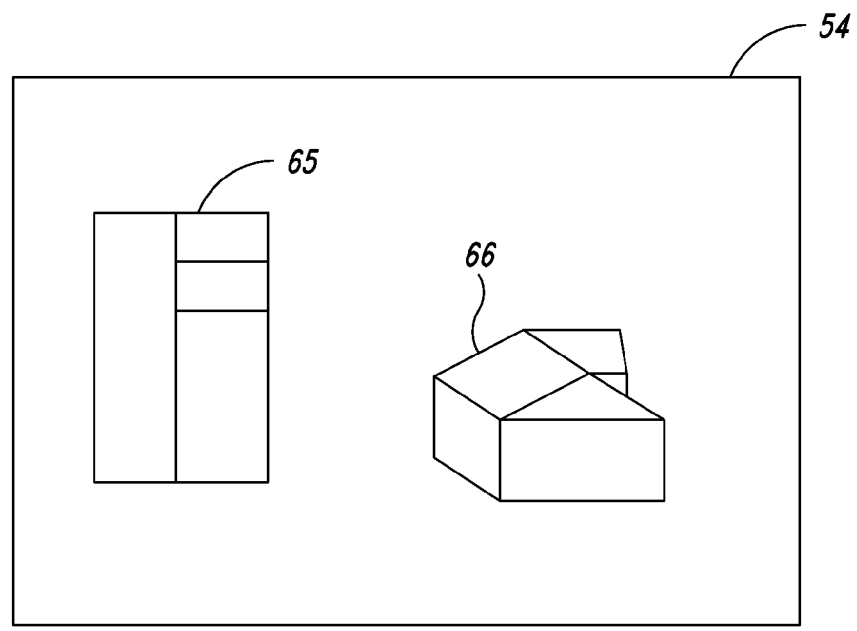
FIG. 3 is an illustration showing the top and perspective view of a house for a particular address.

Referring to the accompanying Figures, there is described a system 10 and method that allows a roofing company 70 to provide a final estimate 102 to a potential customer 90 to install equipment or to repair or replace the roof on a building 92 using aerial images of the building 92. The system 10 includes an estimating software program 50 designed to receive an address for the building 92. The software program 50 is linked to an aerial image file database 52 that contains aerial images files 54 of various building 92 in a region. The aerial image files 54 may be taken any available means, such as an aircraft, balloon, a satellite, etc. As shown in FIG. 3, the image files 54 typically include at least one a top plan view 65 and a perspective view 66 of the building 92. The image files 54 may also include a wide angle image file 67 showing the building 92 and the surrounding areas 67 around the building 92. In one embodiment, an image analysis and calibration module 56 is linked to the software program 50 that enables the roof company 70 to closely estimate the dimensions and slopes of the roofs of the buildings 92 shown in the views 65, 66. By simply inputting the customer's address into the software program 50, the roof company 70 is able view the customer's roof from the aerial image files 54 using a remote computer 72, determine the dimensions and slopes of the roof sections that make up the roof, and prepare a preliminary report 101 which is then used to prepare a final estimate 102 that is then delivered to the potential customer 90.

Figure 1:
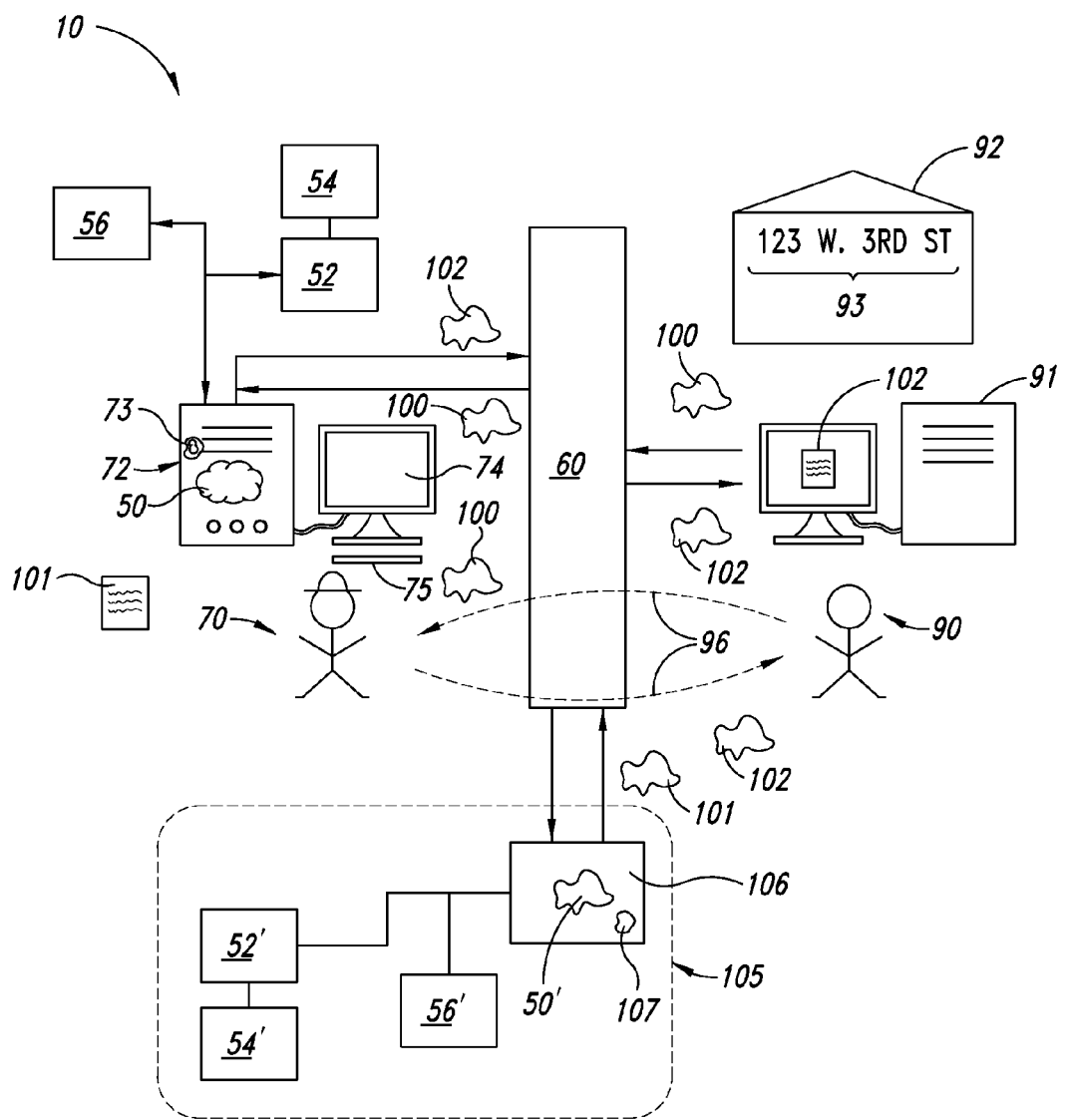
FIG. 1 is an illustration showing the system and method being used by a new customer requesting a roof estimate from a roof contractor who uses his or her computer to access a local or remote image database or from a roof contractor who contacts a remote aerial image or estimate provider and then provides a written estimate to the customer.

FIG. 1 is an illustration showing the system 10 used by a potential customer 90 requesting a roof estimate from a roof company 70 that uses the system 10 described above. The potential customer 90 may be the building tenant, owner or insurance company. The roof company 70 uses a computer 72 which may connect to a wide area network 60. The customer 90 contacts the roof company 70 via his or her computer 91 and the wide area network 60 or by a telecomunication network 96, and requests a roof estimate for his building 92 located at a public address 93. (i.e. 23 W. $3^{rd}$ St). The roof company 70 then processes the request 100 which leads to a final estimate 102 being delivered to the potential customer's computer 91 or via email, fax or postal service to the potential customer 90.

Figure 4:
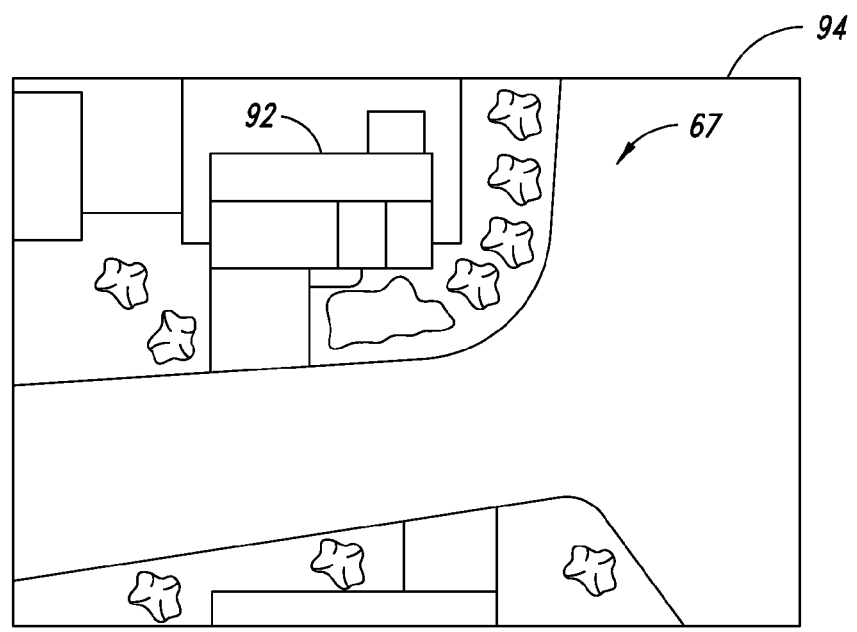
FIG. 4 is an aerial image of the home shown in FIG. 3 showing the areas and structures around the home.

There are several different ways the system 10 can be setup. FIG. 1 shows a first embodiment of the system 10 where the roof company 70 operates a remote computer 72 with a display 74 and a keyboard 75 or similar input means. A roof estimating software program 50 is loaded into the working memory 73 of the remote computer 72. The software program 50 is able to retrieve aerial images of buildings from the database 52 containing aerial images files 54 of buildings located in the region served by the roof company 70. In the first embodiment shown in FIG. 1, the remote computer 72 is linked or connected to a database 52 containing aerial images files 54 of the buildings. The software program 50 includes a calibration module 56 that enables the roof company 70 to determine the angles and dimensions of various roof sections shown in the images files 54. After the angles and dimensions are determined, the combined square footage of the building 92 can be determined which is then used to create a preliminary report 101. The roof company 70 then reviews the wide angle image file 94 (see FIG. 4) to determine if the building 92 has special access and clean up factors that may impact the final estimate 102. Once the preliminary report 101 or the final estimate 102 is prepared by the roof company 70, one or both can be transmitted to the customer 90 via the wide area network 60, the telecomunication network 96, or by postal service.

Also shown in FIG. 1 is an alternative setup of the system 10 wherein a preliminary report 101 is prepared by a separate roof estimating entity 105 which is then forwarded to the roof company 70 who then prepares the final estimate 102 and sends it to the customer 90. The entity 105 includes a computer 106 with a roof estimating software program 50' loaded into the working memory 107. Like the software program 50 loaded into the roof contractor's computer 72 in the previous embodiment the software program 50' is also able to retrieve aerial images of houses from a database 52' containing aerial images files 54' of houses located in the region served by the roof company 70. An optional calibration module 56' may be provided which enables the entity 105 to determine the angles and linear dimensions of various roof sections on the house 92.

When the system 10 is setup to include the estimating entity 105, the customer contacts the roofing company 70. The roof company 70 then contacts the estimating entity 105 and forwards the address of the building 92 thereto. The estimating entity 105 then prepares the preliminary report 101 that is transmitted to the roof company 70. The roof company 70 then prepares the final report 102 and sends it to the customer 90.

Figure 2:
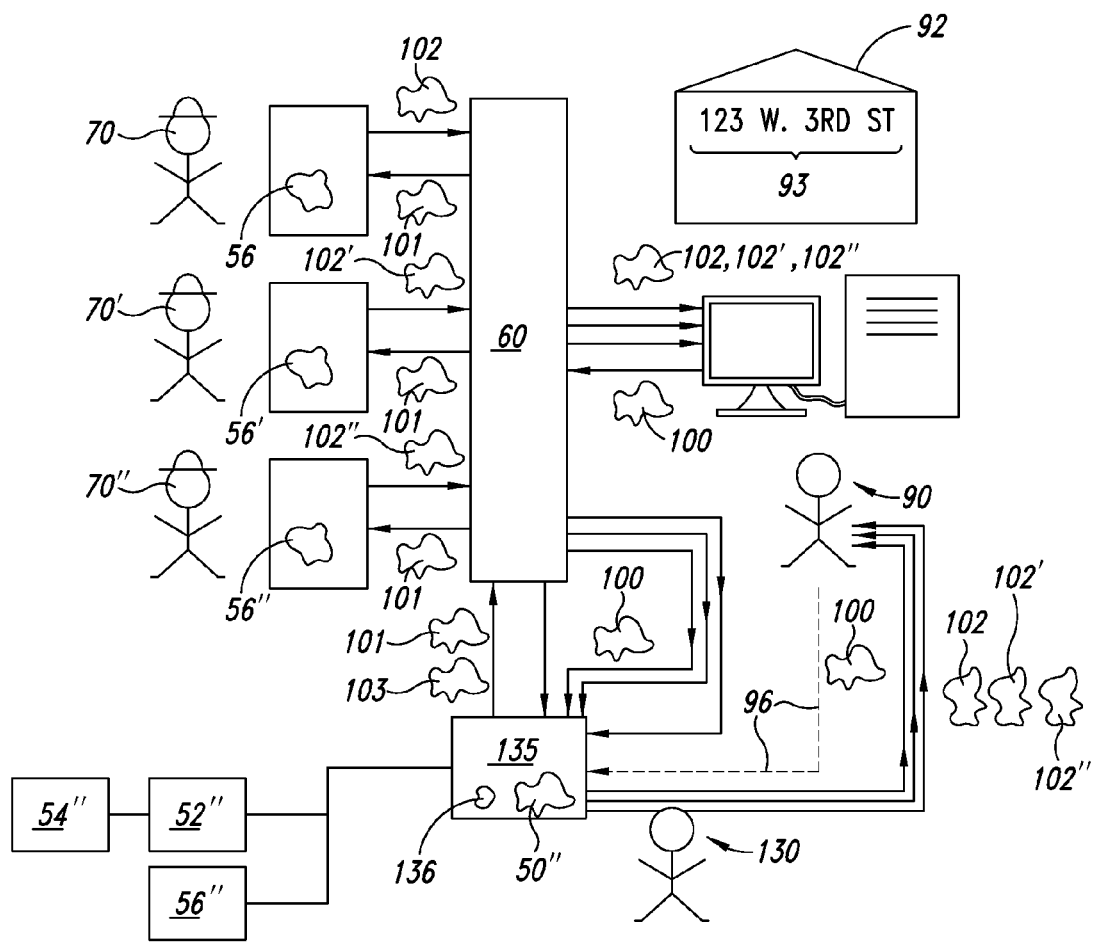
FIG. 2 is an illustration showing the system and method being used by a new customer requesting roof estimates from a plurality of roof contractors which are part of a referral service provided by a remote aerial image or estimate provider that transmits images or an intermediate report to all of the roof contractors who then individually prepare and transmit an estimate to the customer.

FIG. 2 shows a third embodiment of the system 10 where the customer 90 contacts a roof estimating entity 130 who receives a request 100 from the customer 90 via the wide area network 60 or telecommunication network 96. The roof estimating entity 130 prepares a preliminary report 101 which is then transmitted to various roof companies 70, 70', 70" associated with the entity 130. Accompanying the preliminary report 101 may be the name and contact telephone number(s) or email address of the customer 90. Each roof company 70, 70', 70" reviews the preliminary report 101 and any associated images sent therewith and then prepares a final estimate 102, 102', 102". The final estimate 102, 102', 102" is then mailed, emailed or faxed to the customer 90 or back to the estimating entity 130. The estimating entity 130 then sends the final estimate 102, 102', 102" to the customer 90. In this embodiment, the estimating entity 130 includes a computer 135 in which the roof estimating software program 50" is loaded into its working memory 136 loaded and linked to the aerial image database 52" containing image files 54". An optional calibration module 56" may be loaded into the working memory 136 of the computer 135.

Figure 5A:
FIGS. 5A-F are consecutive pages from a preliminary or final report sent to a potential customer prepared by the roofing company.
Figure 5B:
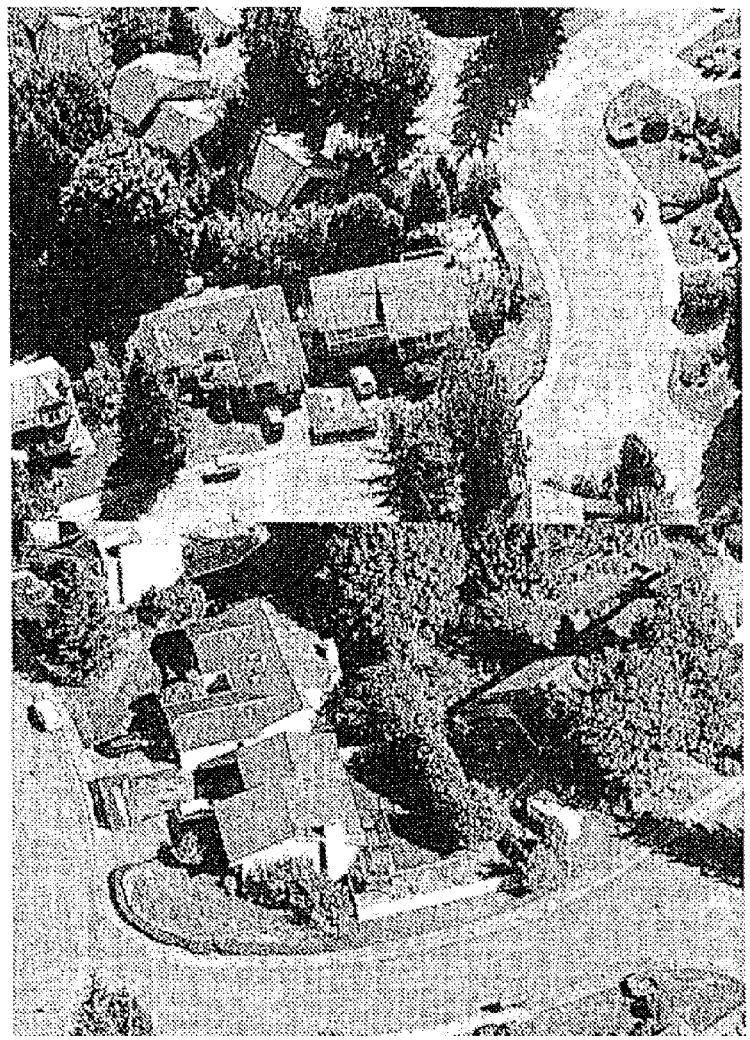
Figure 5C:
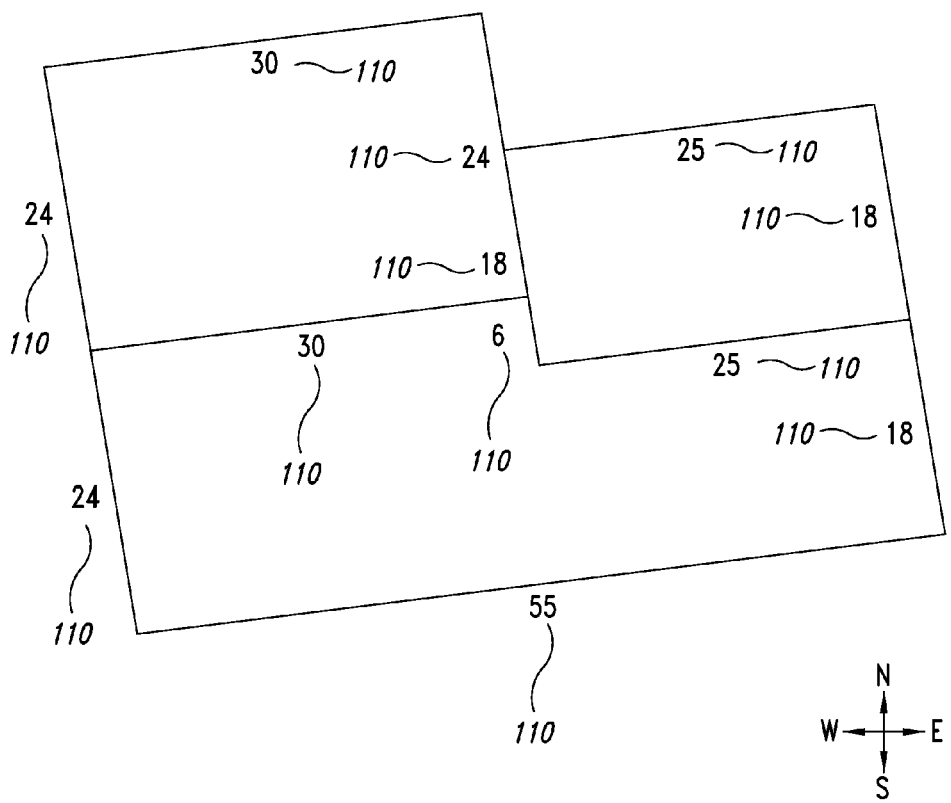
Figure 5D:
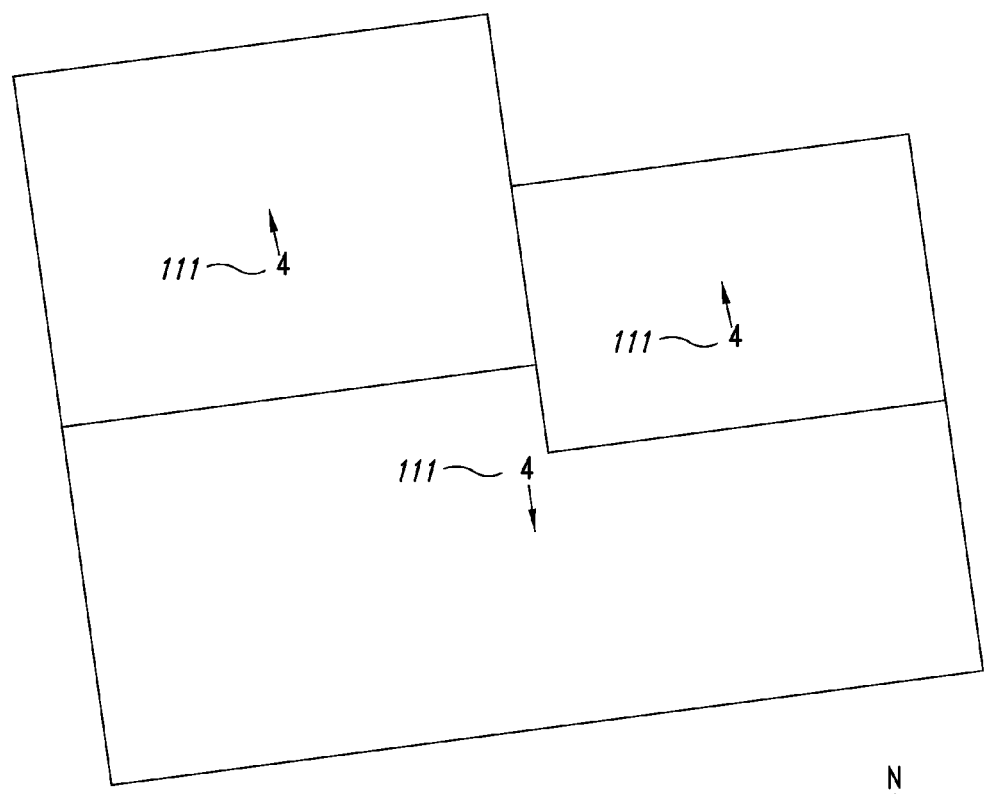
Figure 5E:
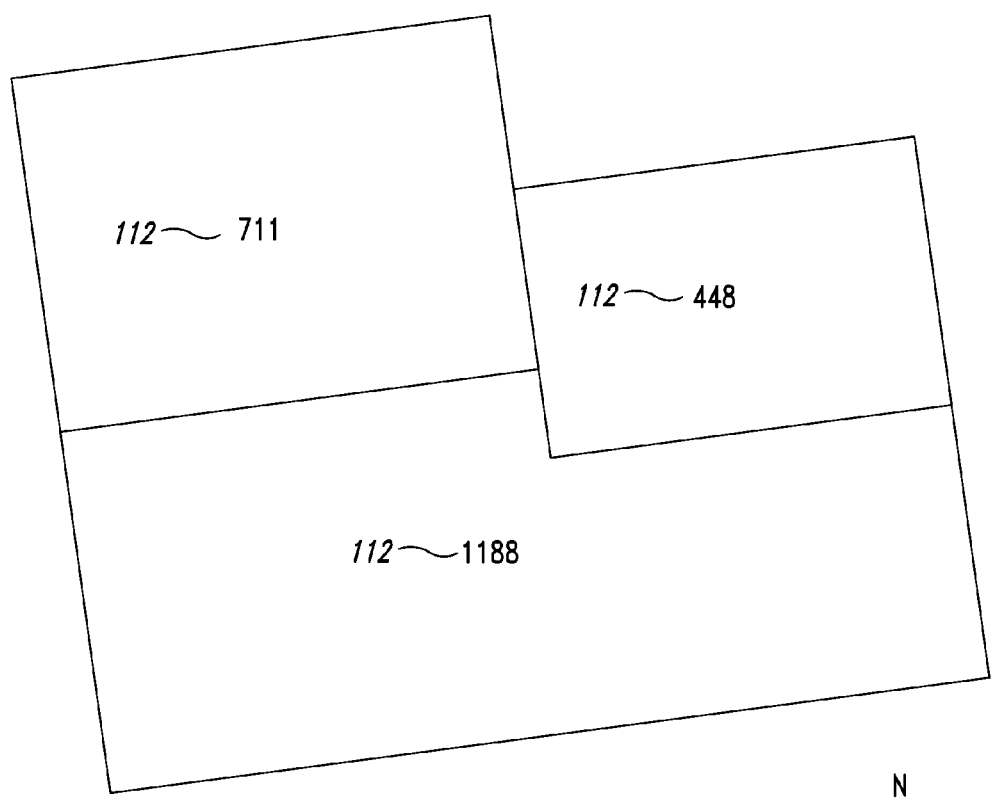
Figure 5F:
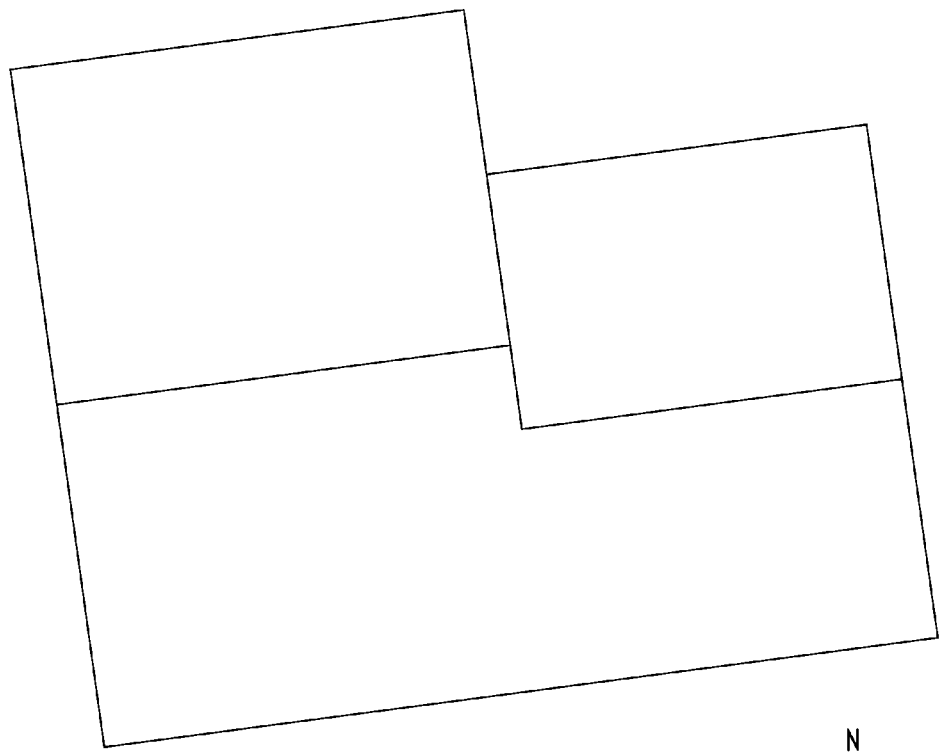

FIGS. 5A-5F are individual pages that make up a representative report. In FIG. 5A, a cover page 103 lists the address of the building and an overhead aerial image of the building. In FIG. 5B, a second page 104 of the report is shown that shows wide overhead perspective view of the building at the address with the surrounding areas more clearly shown. FIG. 5C is the third page 106 of the report which shows a line drawing of the building showing ridge and valley lines, dimensions 110 and a compass indicator. FIG. 5D is an illustration of the fourth page 107 of the report showing the pitch angle 111 of each roof section along with a compass indicator. FIG. 5E is an illustration of the fifth page 108 of the report showing the square footage 112 of each roof section along with the total square foot area value. FIG. 5F is an illustration of a sixth page 109 of the report showing an overall, aerial line drawing of the building where notes 113 or written comments may be written.

Using the above system, a detailed description of how the system is used is now provided.

First, a property of interest is identified by a potential customer of the service. The customer contacts the service with the location of the property. Typically, this will be a street address. The service then uses a geo-coding provider to translate the location information (such as a street address) into a set of coordinates that can be used to query an aerial or satellite image database. Typically, the geo-coding provider will be used to translate the customer supplied street address into a set of longitude-latitude coordinates.

Next, the longitude-latitude coordinates of the property are then used to query an aerial and/or satellite imagery database in order to retrieve one or more images of the property of interest. It is important to note that flat roofs only require a single image of the property. Roofs containing one or more pitched sections typically require two or more photographs in order to identify and measure all relevant sections and features of the roof.

Once the images of the roof section of the building are obtained, at least one of the images needs to be calibrated. During calibration, the distance in pixels between two points on the image is converted into a physical length. This calibration information is typically presented as a scale marker on the image itself, or as additional information supplied by the image database provider along with the requested image.

The image(s) and calibration information returned by the imagery database is entered or imported into the service's measurement software.

A set of reference points are identified in each of the images. The service's measurement software then uses these reference points and some proprietary algorithms to co-register the images and reconstruct the three dimensional geometry of the object identified by the reference points. There are a variety of photo-grammetric algorithms that can be utilized to perform this reconstruction. One such algorithm used by the service uses photographs taken from two or more view points to 'triangulate' points of interest on the object in 3D space. This triangulation can be visualized as a process of projecting a line originating from the location of the photograph's observation point that passes through a particular reference point in the image. The intersection of these projected lines from the set of observation points to a particular reference point identifies the location of that point in 3D space. Repeating the process for all such reference points allows the software to build a 3D model of the structure.

The optimal choice of reconstruction algorithm depends on a number of factors such as the spatial relationships between the photographs, the number and locations of the reference points, and any assumptions that are made about the geometry and symmetry of the object being reconstructed. Several such algorithms are described in detail in textbooks, trade journals, and academic publications.

Once the reconstruction of the building is complete, the results are reviewed for completeness and correctness. If necessary, a user of the service's software will make corrections to the reconstructed model.

Information from the reconstructed model is used to generate a report containing information relevant to the customer. If the report is meant for delivery to a roofing company, the information in the report may include total square footage, square footage 112 and pitch 111 of each section of roof, linear measurements 110 of all roof segments, identification and measurement of ridges and valleys, and different elevation views rendered from the 3D model (top, side, front, etc).

Using the above description, a method for estimating the size and the repair or replacement costs of a roof comprising the following steps:

a. selecting a roof estimation system that includes a computer with a roof estimation software program loaded into its working memory, said roof estimation software uses aerial image files of buildings in a selected region and a calibration module that allows the size, geometry, and orientation of a roof section to be determined from said aerial image files;

b. submitting a request for a measurement of a roof of a building at a known location;

c. submitting the location information of a building with a roof that needs a size determination, a repair estimate, or replacement estimate;

d. entering the location information of said building and obtaining aerial image files of one or more roof sections used on a roof; and, e. using said calibration module to determine the size, geometry and pitch of each said roof section.

In the above method, the entity requesting the measurement is the building tenant, the building owner, or the insurance request.

In compliance with the statute, the invention described herein has been described in language more or less specific as to structural features. It should be understood however, that the invention is not limited to the specific features shown, since the means and construction shown, is comprised only of the preferred embodiments for putting the invention into effect. The invention is therefore claimed in any of its forms or modifications within the legitimate and valid scope of the amended claims, appropriately interpreted in accordance with the doctrine of equivalents.

The invention claimed is:

1. A process comprising:

receiving, by at least one computer processor that includes a calibration module stored in a non-transitory memory coupled to the at least one processor, a plurality of aerial image fields of a building having a roof including a first aerial image file taken from a first viewpoint of the building a second aerial image filed taken from a second viewpoint of the building different than the first viewpoint, wherein at least one of the first aerial image file and the second aerial image file has calibration information associated with the at least one of the first aerial image file and the second aerial image file;

determining, by any of the at least one computer processor, a pitch and an area of one or more roof sections of the roof based on an image analysis performed on the plurality of aerial image files, wherein the image analysis comprises:

constructing a three dimensional model of one or more roof sections by:

calibrating at least one of the first and second aerial image files using the calibration information associated with the at least one of the first aerial image file and the second aerial image file to convert a distance in pixels between two points on the respective aerial image file into a physical length;

identifying common reference points depicted in at least the first aerial image file and the second aerial image file;

identifying, for all such reference points, a location in three-dimensional space by triangulating the reference points by projecting a first line originating from the first viewpoint through one of the reference points and a second line originating from the second viewpoint through the same reference point and determining an intersection of the first and second lines; and determining physical length between at least two of the reference points in three-dimensional space based at least in part on the calibration;

generating, by any of the at least one computer processor a roof report that includes the pitch and the area of the one or more roof sections based on the determined pitch and area of the one or more roof sections wherein the roof report is useful as a guide to repair or replace the roof of the building, where in the pitch is indicative of a vertical rise of a roof section over a horizontal run of the roof section; and outputting the roof report having the determined pitch therein.

2. The process of claim 1 wherein the roof report includes one or more top plan views of the three-dimensional model of the roof annotated with numerical values that indicate a corresponding slope, area, and length of edges of at least two of the one or more roof sections using at least two different indicia for different types of roof properties.

3. The process of claim 1 wherein the roof report includes one or more top plan views of a three-dimensional model of the roof and includes numerical values on the one or more top plan views that are numerical values of a corresponding slope, area, or length of an edge of at least one of the one or more roof sections.

4. The process of claim 3 wherein the roof report indicates whether each of the numerical values are either of the corresponding, slope, area or length of an edge of the one or more roof sections at least in part by where the numerical values are placed on the top plan view relative to the one or more roof sections.

5. The process of claim 4 wherein at least two of the numerical values are placed adjacent to corresponding edges of the one or more roof sections on the top plan view to indicate the at least two of the numerical values are each lengths of the corresponding edges to which the at least two of the numerical values are adjacent.

6. The process of claim 4 wherein at least one of the numerical values is placed generally in a center of the one or more roof sections on the top plan view to indicate the at least one of the numerical values is an area of one or more roof sections.

7. The process of claim 3 wherein the roof report indicates whether at least two of the numerical values are either of the corresponding slope of the one or more roof sections, area of the one or more roof sections or length of an edge of the one or more roof sections at least in part by an annotation next to each of the at least two numerical values.

8. The process of claim 7 wherein the at least two of the numerical values are of the corresponding slope of the one or more roof sections and the annotation is an arrow adjacent to the numerical value to indicate the numerical value is of the corresponding slope of the one or more roof sections.

* * * * *

UNITED STATES PATENT AND TRADEMARK OFFICE
CERTIFICATE OF CORRECTION

PATENT NO. : 10,528,960 B2  
APPLICATION NO. : 13/371271  
DATED : January 7, 2020  
INVENTOR(S) : Chris Pershing and Dave P. Carlson Page 1 of 1

It is certified that error appears in the above-identified patent and that said Letters Patent is hereby corrected as shown below:

On the Title Page

Under References Cited Item (56):
Page 4, Column 1, Line 9: After "Drawing." delete "." and insert -- received January 31, 2012 --

In the Claims

Column 7, Line 21: After "by" insert -- any --

Column 7, Line 24: Delete "fields" and replace with -- files --

Column 7, Line 26: After "image" delete "filed" and replace with -- file --

Column 8, Line 9: After "building," delete "where in" and replace with -- wherein --

Signed and Sealed this  
Seventeenth Day of March, 2020

Andrei Iancu  
*Director of the United States Patent and Trademark Office*